United States Patent
Ravikiran et al.

(10) Patent No.: US 7,851,575 B2
(45) Date of Patent: Dec. 14, 2010

(54) POLYCYCLIC POLYMERS CONTAINING PENDANT ION CONDUCTING MOIETIES

(75) Inventors: Ramakrishna Ravikiran, Cleveland, OH (US); Xiaoming Wu, Strongsville, OH (US); Larry F. Rhodes, Silver Lake, OH (US); Robert A. Shick, Strongsville, OH (US); Hiroko Nakano, Kawasaki (JP); Hirotaka Nonaka, Kawasaki (JP); Huabin Wang, Dayton, OH (US); Robert John Duff, Maple Heights, OH (US); Saikumar Jayaraman, Chandler, AZ (US); John-Henry Lipian, Medina, OH (US)

(73) Assignee: Promerus LLC, Brecksville, OH (US)

( * ) Notice: Subject to any disclaimer, the term of this patent is extended or adjusted under 35 U.S.C. 154(b) by 551 days.

(21) Appl. No.: 11/983,505

(22) Filed: Nov. 9, 2007

(65) Prior Publication Data

US 2008/0242750 A1    Oct. 2, 2008

Related U.S. Application Data

(62) Division of application No. 10/860,876, filed on Jun. 4, 2004, now Pat. No. 7,312,292.

(60) Provisional application No. 60/476,889, filed on Jun. 6, 2003.

(51) Int. Cl.
C08F 30/02    (2006.01)

(52) U.S. Cl. .............. 526/274; 526/308; 526/348.1; 526/280; 526/287; 526/317.1

(58) Field of Classification Search ............ 526/348.1, 526/308, 280, 274, 287, 317.1
See application file for complete search history.

(56) References Cited

U.S. PATENT DOCUMENTS

| | | | | |
|---|---|---|---|---|
| 5,705,503 | A * | 1/1998 | Goodall et al. | 526/281 |
| 6,103,445 | A * | 8/2000 | Willson et al. | 430/270.1 |
| 6,232,417 | B1 * | 5/2001 | Rhodes et al. | 526/171 |

FOREIGN PATENT DOCUMENTS

| | | | |
|---|---|---|---|
| JP | 11-171935 | * | 6/1999 |
| JP | 2000-109525 | * | 4/2000 |
| JP | 2001-019723 | * | 1/2001 |

* cited by examiner

*Primary Examiner*—Ling-Siu Choi
(74) *Attorney, Agent, or Firm*—Bernard Berman

(57) ABSTRACT

A polymer comprising polycyclic repeating units having recurring ion conducting groups and optional crosslinkable groups is disclosed. The present invention provides the capability of tailoring polymers to impart unique properties to membranes fabricated from the polymers. Membranes comprising the polymers and methods for preparing the membranes and their use in ion conducting membranes, particularly in fuel cells, are also provided.

7 Claims, No Drawings

POLYCYCLIC POLYMERS CONTAINING PENDANT ION CONDUCTING MOIETIES

CROSS REFERENCE TO RELATED APPLICATIONS

This application is a divisional of U.S. patent application Ser. No. 10/860,876, filed Jun. 4, 2004, now U.S. Pat. No. 7,312,292 which claims priority to U.S. Provisional Application No. 60/476,889 filed Jun. 6, 2003, which are incorporated herein by reference.

TECHNICAL FIELD

The present invention relates generally to polycyclic polymers that contain pendant recurring ion conducting moieties and more specifically to films and membranes fabricated therefrom.

BACKGROUND

Proton conducting membranes (PEM) are widely utilized in electrochemical devices which employ a chemical reaction to produce or store electricity. Exemplary electrochemical devices include fuel cells, electrolysis cells, hydrogen separation cells, and batteries.

An increasingly important use for PEM materials is in fuel cells. A fuel cell generates electricity from the electrochemical reaction of a fuel (e.g., hydrogen, methane or methanol) and oxygen. A fuel cell contains a PEM interposed between an anode and a cathode, each contained in its own compartment. The anode and the cathode are connected through an external circuit which can have a load such as an electric drive motor. Anodes and cathodes are generally coated with precious metals such as platinum to catalyze the electrochemical reactions occurring at the anode and cathode. At the anode, hydrogen (from the fuel source) is oxidized to protons and electrons. The electrons are conducted by the anode through the external load and back to the cathode. The protons are transported directly across the PEM to the cathode where they are combined with electrons (returning from the external load) and oxygen to form water. The ability of the PEM to effectively conduct protons to the cathode while acting as an impermeable barrier to fuel cell gases and liquids are integral factors in maintaining fuel cell efficiency. The flow of current is sustained by a flow of protons across the PEM and electrons through the external load. Theoretically, fuel cells can produce power continuously so long as the supply of fuel and oxygen is sustained and the PEM material maintains its physical integrity and proton conducting efficiency. All fuel cells are limited by the performance of the PEM.

There are many types of fuel cell configurations in common use (e.g., direct hydrogen/air fuel cell, indirect hydrogen/air fuel cell, and organic fuel cell), each having associated advantages and disadvantages. One type of fuel cell is the direct methanol fuel cell (DMFC). A DMFC utilizes methanol as the proton source. An aqueous solution of methanol is directly fed into cell, where the fuel is oxidized at the anode to produce $CO_2$, electrons and protons. The protons are transported across the PEM where oxygen is reduced to water at the cathode.

The PEM plays a very important role in the operation of fuel cells. On one hand it acts as a proton conducting medium, permitting the transfer of hydrated protons ($H_3O^+$) from the anode to the cathode, and on the other hand it functions as a barrier that is impermeable to fuel cell gases and liquids. The PEM must meet many specifications relating to mechanical, chemical, and electrical properties. For example, the polymer must be able to be cast into thin films without defects. The mechanical properties must permit the membrane to withstand assembly operations such as being clamped between metal frames. The polymer must have good stability to hydrolysis and exhibit good resistance to harsh chemical reactions such as oxidation and reduction. The polymer must exhibit good thermal stability as well as a need to endure wide fluctuations in temperature conditions. The PEM must also have an affinity for hydration since the transport of protons across the polymer membrane occurs in the form of hydronium ions in aqueous medium. Finally, the PEM must have high proton conductivity or the ability for proton transport across the membrane. This conductivity is provided by the ability to functionalize the polymer with strong acidic groups.

Heretofore, various polymers have been utilized for the PEM but with only limited success. One such polymer is Nafion® (available from DuPont) which is a sulfonated poly (perfluoroethylene). Despite this limited success, Nafion polymers are generally considered to be the current standard PEM. However, the use of such perfluoroethylene polymers as PEM's can be problematic.

For example, while in many current applications the membrane is maintained at an operating temperature close to ambient (i.e., not exceeding 80° C.), higher operating temperatures (approaching 120° C. and above) are desirable from the standpoint of increasing catalyst efficiency at the anode. Perfluoroethylene polymers such as Nafion generally suffer from poor thermal stability and mechanical strength at such higher operating temperatures. Generally, after thirty days of continuous exposure to operating temperatures of 120° C. perfluoroethylene polymers are virtually unusable. It is believed that such poor thermal stability and mechanical strength of perfluoroethylene polymers are due to their lack of a crosslinked structure.

Another issue with membranes fabricated from perfluoroethylene polymers arises from the requirement to maintain high levels of moisture within the membrane. A high level of hydration is necessary to facilitate trans-membrane proton transport, while reduced levels of hydration results in decreased proton transport efficiency. Accordingly, it is necessary to humidify the membrane during fuel cell operation to maintain transport efficiency. This requires additional equipment to regulate and maintain the overall water balance requirements of the fuel cell. However, as temperatures in the fuel cell are increased to take advantage of higher catalyst efficiencies, an attendant decrease in humidity levels occurs within the cell. Consequently, the fuel cell must be pressurized when cell temperatures exceed 100° C.

Another problem found with perfluoroethylene polymers is in their use in direct methanol fuel cells. Since perfluoroethylene polymers can be permeable to methanol, methanol can leak from the anode compartment across the membrane into the cathode compartment reducing fuel cell efficiency.

Recently, on Jan. 23, 2001, a new PEM material was disclosed in Japanese published Patent Application No. 2001-019723, assigned to Toyota Central Research & Development Lab Inc. The PEM of this application is a copolymer formed of norbornene monomers with an olefinic monomer such as trifluorostyrene. As with Nafion perfluoro-ethylene polymers, the polymer disclosed in the Toyota application is not crosslinked. In addition, the disclosed polymer contains only one type of functionality pendant from the polymer backbone (i.e., a sulfonic acid functionality added to the phenyl ring of the styrenic repeating unit). Therefore it would appear that this polymer would suffer some of the same drawbacks of the Nafion polymers.

Accordingly, there is still an unsatisfied need for new polymers which can be readily fabricated into thin film membranes and which can be tailored to meet the stringent conditions required by operating fuel cells. Such thin film membranes should require little or no additional humidification, and should be capable of being operated at elevated temperatures, for example in excess of 120° C., and/or they should be more resistant to methanol permeability than Nafion type polymer membranes, advantageously making them advantageous for proton conducting membranes of fuel cells and the like.

DESCRIPTION OF EXEMPLARY EMBODIMENTS

Exemplary embodiments in accordance with the present invention will be described. Various modifications, adaptations or variations of such exemplary embodiments described herein may become apparent to those skilled in the art as such are disclosed. It will be understood that all such modifications, adaptations or variations that rely upon the teachings of the present invention, and through which these teachings have advanced the art, are considered to be within the scope and spirit of the present invention.

In one aspect, embodiments of the present invention relate to polymer compositions that encompass a polycyclic addition polymer containing recurring pendant ion conducting groups along the polymer backbone. In some embodiments of the present invention a polycyclic addition polymer is post-functionalized to contain recurring pendant ion conducting moieties. Some exemplary embodiments in accordance with the present invention relate to crosslinked and non-crosslinked polymers and polymerizable compositions for preparing such polymers. Other embodiments relate to polymers that are easily tailored for use in harsh environmental conditions. Yet other such embodiments relate to polymer films and membranes containing ion conducting groups as well as selected optional functional groups that are suitable for use as ion conducting membranes in electrolytic and fuel cell applications.

Polymers

The polycyclic polymer of the present invention comprises polycyclic repeating units that are substituted with a pendant ion conducting moiety. In some embodiments of the invention, the polycyclic addition polymers comprise one or more repeating units selected from Formula I (described below). In other embodiments of the invention, the polycyclic addition polymer comprises one or more repeating units selected from Formula I and one or more repeating units selected from Formula II (described below).

The repeating unit under Formula I is represented by a structure(s) selected from:

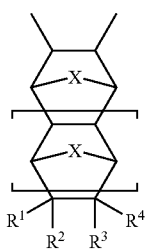

I wherein X represents —$CH_2$—, —$CH_2CH_2$—, O, or S, n is an integer from 0 to 5 inclusive; $R^1$ to $R^4$ independently represent a substituent selected from hydrogen, linear and branched ($C_1$ to $C_{20}$) alkyl, linear and branched ($C_1$ to $C_{20}$) haloalkyl, subject to the proviso that at least one of $R^1$ to $R^4$ must represent a pendant ion conducting moiety or salts thereof selected from sulfonic acid, phosphoric acid and carboxylic acid moieties represented by the formulae:

-(A)$_q$-(SO$_3$H)$_r$

-(A)$_q$-OP(O)(OH)(OR)

-(A)$_q$-P(O)(OH)(OR)

—(CH$_2$)$_m$C(O)OH wherein A is a spacer moiety represented by —(CH$_2$)$_m$—, —(CH$_2$)$_m$O—, —(CH$_2$)$_m$O(CH$_2$)$_m$—, —O(CH$_2$)$_m$—, —(CH$_2$)$_m$NR$^{15}$(CH$_2$)$_m$—, —(CH$_2$)$_m$-aryl-, —O(CH$_2$)$_m$-aryl-, —(CH$_2$)$_m$O(CH$_2$)$_m$-aryl-, -aryl-O(CH$_2$)$_m$—, -aryl-NR$^{15}$(CH$_2$)$_m$—, —(C(R$^{16}$)$_2$)$_m$(C(R$^{16}$)$_2$)$_m$O(C(R$^{17}$)$_2$)$_a$—, -(aryl)$_m$-(aryl)$_m$-, and

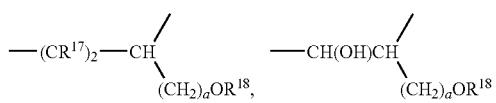

wherein aryl represents phenyl, naphthyl, and anthracenyl, R is selected from hydrogen, linear and branched ($C_1$ to $C_{10}$) alkyl, linear and branched ($C_1$ to $C_{10}$) haloalkyl, and substituted and unsubstituted ($C_6$-$C_{16}$) aryl; $R^{15}$ independently is selected from hydrogen and ($C_1$ to $C_5$) alkyl, $R^{16}$ independently is selected from hydrogen, halogen, ($C_1$ to $C_5$) alkyl, and ($C_1$ to $C_5$) haloalkyl, $R^{17}$ independently is selected from hydrogen and halogen, $R^{18}$ is selected from hydrogen and ($C_1$ to $C_{10}$) alkyl and ($C_1$ to $C_5$) haloalkyl; a is 2 to 6; m independently is 0 to 4, r is 1 to 3, and q is 0 or 1, subject to the proviso that when said ion conducting moiety is a phosphoric acid group it can not be directly connected to an oxygen atom on said spacer moiety. In the spacer moieties that contain an aryl group it is to be recognized that the sulfonic acid or phosphoric acid group can be covalently bonded to any aryl carbon atom in the aryl group(s). For purposes of illustration, when A is the bridging moiety —O(CH$_2$)$_m$-aryl-, the pendant ion conducting moiety can be represented as set forth below:

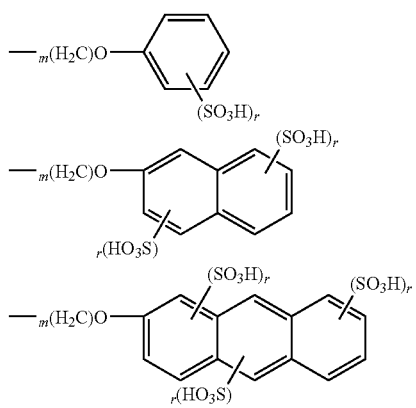

-continued

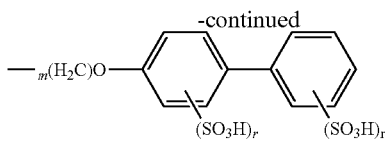

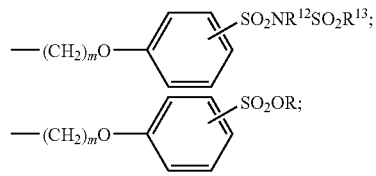

wherein r independently is 0 or 1, subject to the proviso that r cannot all be 0 at the same time (i.e., one sulfonic acid group has to be present when the aryl group is naphthalene and anthracene). As used here and throughout the specification, it should be noted that the diagonal line set forth in the above formulae represents a covalent bond to any of the carbon atoms present in the carbocyclic and heterocyclic rings. It is to be recognized that when the bond is present on a particular carbon atom that carbon atom will contain one less hydrogen atom to balance its valence.

As used here and throughout the specification, the term haloalkyl means that at least one hydrogen atom on the alkyl group is replaced with a halogen atom selected from fluorine, chlorine, bromine, iodine, and combinations thereof. The degree of halogenation can range from at least one hydrogen atom on the alkyl radical being replaced by a halogen atom (e.g., a monofluoromethyl group) to full halogenation (e.g., perhalogenation) wherein all hydrogen atoms on the alkyl group have been replaced by a halogen atom (e.g., trifluoromethyl or perfluoromethyl). The haloalkyl groups useful in embodiments of the invention are partially or fully halogenated and are linear or branched, and in one embodiment are represented by the formula $C_zX''_{2z+1}$ wherein X'' independently is selected from hydrogen and halogen atoms (fluorine, chlorine, bromine, iodine) and z is selected from an integer of 1 to 20, and at least one of X'' must be a halogen atom.

The repeating unit under Formula II is represented by a structure(s) selected from:

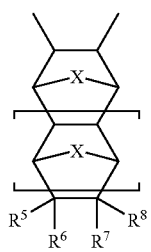

The substituents $R^5$ to $R^8$ independently represent a radical selected from hydrogen, linear and branched ($C_1$ to $C_{20}$) alkyl; linear and branched ($C_1$ to $C_{20}$) haloalkyl; substituted and unsubstituted ($C_4$-$C_{12}$) cycloalkyl; linear and branched ($C_2$ to $C_{10}$) alkenyl; substituted and unsubstituted ($C_5$-$C_8$) cycloalkenyl; ($C_2$-$C_{10}$) alkynyl; substituted and unsubstituted ($C_6$-$C_{24}$) aryl; substituted and unsubstituted ($C_7$-$C_{24}$) aralkyl; hydroxyl; substituted and unsubstituted ($C_1$ to $C_{10}$) hydroxyalkyl; —$(CH_2)_mC(CF_3)_2OR$; —$(CH_2)_mC(O)OR^9$; —$(CH_2)_mOR^9$; —$(CH_2)_mOC(O)R^9$; —$(CH_2)_mC(O)R^9$; —$(CH_2)_mOC(O)OR^9$; —$(CH_2)_mC(O)OR^{10}$; —$(CH_2)_mSi(R^{11})_3$; —$(CH_2)_mSi(OR^{11})_3$; —$(CH_2)_mNR^{12}SO_2R^{13}$; —$(CH_2)_mSO_2NR^{12}R^{13}$; —$(CH_2)_mNHR$; and the groups selected from the structures below:

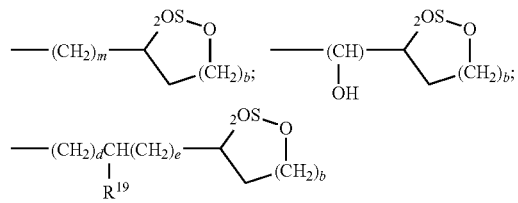

and a pendant sultone selected from:

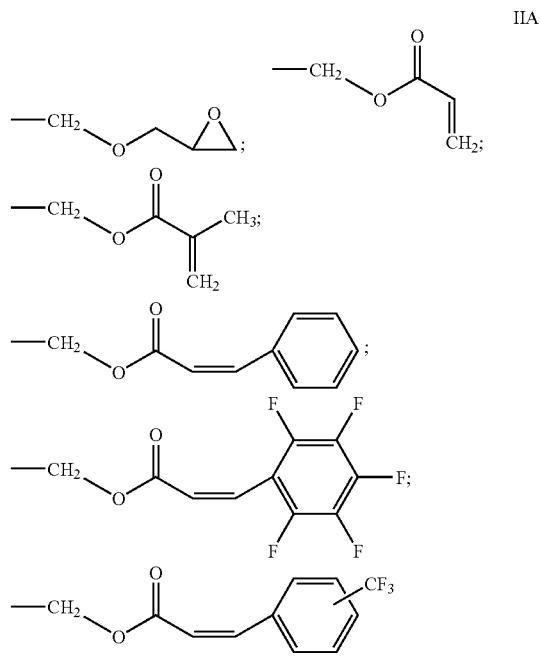

wherein b is 1 to 4; d is 0 to 2; e is 0 or 1; and $R^{19}$ is selected from hydrogen, —OH, and —COOR.

$R^5$ to $R^8$ can also represent a pendant epoxy, acrylate or cinnamate moiety represented by, but not limited to, the structures set forth under Formulae IIA as follows:

IIA

In Formula II and IIA X, m, n and R are as previously defined. $R^9$ is selected from hydrogen, linear or branched ($C_1$ to $C_{10}$) alkyl, substituted and unsubstituted ($C_4$-$C_8$) cycloalkyl, substituted and unsubstituted ($C_6$-$C_{24}$) aryl, and substituted and unsubstituted ($C_7$-$C_{24}$) aralkyl. $R^{10}$ is selected from an acid labile group. $R^{11}$ independently is selected from hydrogen and ($C_1$ to $C_5$) alkyl. $R^{12}$ is selected from hydrogen, linear and branched ($C_1$-$C_5$) haloalkyl, linear and branched tri($C_1$-$C_{10}$) alkylsilyl, and the groups —$C(O)CF_3$, —$C(O)OR^{14}$, and —$OC(O)OR^{14}$. $R^{13}$ is selected from hydrogen, linear and branched ($C_1$-$C_{10}$) alkyl, linear and branched ($C_1$-

$C_5$) haloalkyl, —OR, —C(O)R, substituted and unsubstituted ($C_3$-$C_8$) cycloalkyl, substituted and unsubstituted cyclic esters (lactones) containing 2 to 8 carbon atoms (excluding the carbonyl carbon), substituted and unsubstituted cyclic ketones containing 4 to 8 carbon atoms (excluding the carbonyl carbon), substituted and unsubstituted cyclic ethers and cyclic diethers containing 4 to 8 carbon atoms. $R^{14}$ is selected from linear and branched ($C_1$-$C_{10}$) alkyl (preferably t-butyl), linear and branched ($C_1$-$C_{10}$) haloalkyl, substituted and unsubstituted ($C_6$-$C_{14}$) aryl, and substituted and unsubstituted ($C_7$-$C_{20}$) aralkyl.

$R^5$ and $R^6$ or $R^7$ and $R^8$ can be taken together to form a ($C_1$-$C_5$) alkylidenyl group or a spiral anhydride group. $R^6$ and $R^7$ taken together along with the two ring carbon atoms to which they are attached can form a cyclic anhydride group, a cyclic sulfonamide (sultam) group or a sultone group containing 3 to 6 carbon atoms.

For illustrative purposes, a polycyclic repeating unit wherein n is 0 and $R^5$ and $R^6$ or $R^7$ and $R^8$ are taken together to form a spiral anhydride group is represented as follows:

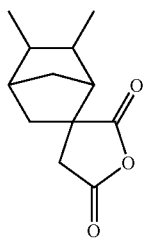

For illustrative purposes, a polycyclic repeating unit wherein n is 0 and $R^6$ and $R^7$ taken together with the two ring carbon atoms to which they are attached form a cyclic anhydride group is represented as follows:

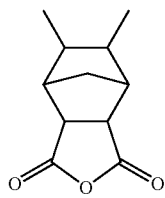

Sultams formed by $R^6$ and $R^7$ taken together with the two ring carbon atoms contributed by the polycyclic repeating unit are represented by the formulae:

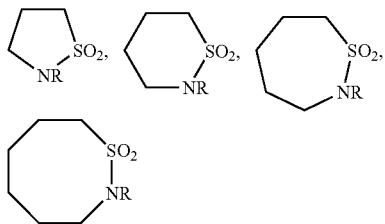

wherein R is as previously defined.

Sultone groups formed by $R^6$ and $R^7$ taken together with the two ring carbon atoms contributed by the polycyclic repeating unit are represented by the formulae:

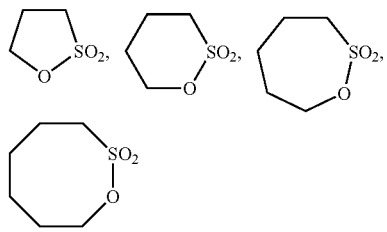

In the sultam and sultone groups represented above, it is to be recognized that the ring carbon atoms contributed by the polycyclic ring to which $R^6$ and $R^7$ are attached can be any two consecutive carbon atoms in the sulfonamide or sultone ring. Accordingly, for illustrative purposes, the polycyclic repeating units containing cyclic sulfonamide (sultam) and sultone groups are represented as follows:

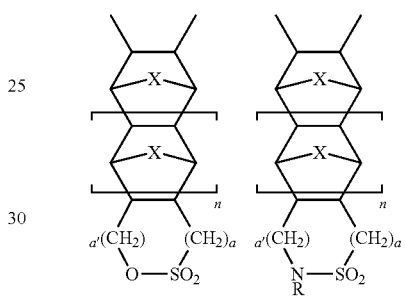

wherein X, n and R are as previously described, and a and a' independently represent an integer of 0 to 4. The sum of a and a' can not exceed 4, and a and a' can not both be 0 at the same time.

Additional polycyclic repeating units containing sulfonamide groups that can be present in the polymer backbone are disclosed in U.S. Pat. No. 6,235,849, the disclosure of which is hereby incorporated by reference.

As used in the definition of $R^{10}$ in Formula II, an acid labile group is defined herein to mean a blocking or protecting moiety capable of being cleaved from a carboxy group in the presence of an acid. Upon cleavage of the protecting moiety, for example by hydrolysis, a polar functional group is formed which can confer different solubility characteristics to the polymer. Representative acid labile groups under $R^{10}$ are selected from but not limited to a radical selected from —C(CH$_3$)$_3$, —Si(CH$_3$)$_3$, —CH(R$^6$)OCH$_2$CH$_3$, —CH(R$^6$)OC(CH$_3$)$_3$, dicyclopropylmethyl, dimethylcyclopropylmethyl, or the following cyclic groups:

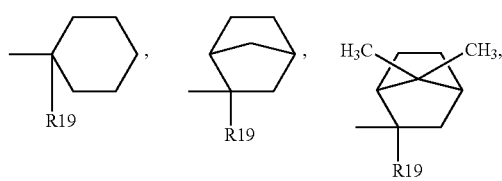

-continued

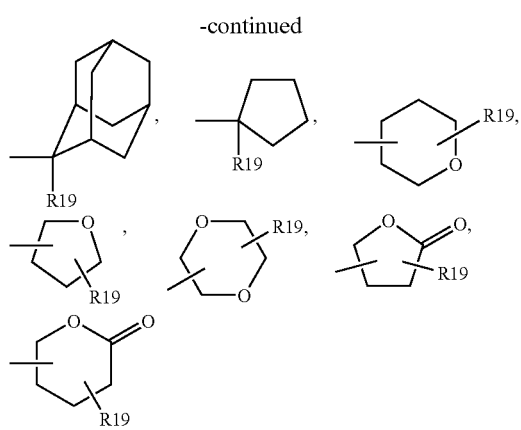

wherein $R^{19}$ represents hydrogen or a linear or branched ($C_1$-$C_5$) alkyl group. The alkyl substituents include but are not limited to methyl, ethyl, propyl, i-propyl, butyl, i-butyl, t-butyl, pentyl, t-pentyl and neopentyl. In the above structures, the single bond line projecting from the illustrated cyclic groups represents the covalent bond between the acid labile group and the oxygen atom of the carboxyl group. It is also to be recognized that this covalent bond and the $R^{19}$ substituent can be situated on any ring carbon atom as shown in the heterocyclic moieties above. In one embodiment, the bond to the carboxyl group and the $R^{19}$ substituent are situated on the same ring carbon atom forming a tertiary ring carbon as illustrated in several of the cyclic moieties set forth above.

By the term substituted as used here and throughout the specification is meant that the substituent is selected from linear and branched ($C_1$-$C_5$) alkyl, ($C_1$-$C_5$) haloalkyl, ($C_4$-$C_8$) cycloalkyl, phenyl, halogen, and combinations thereof. The degree of substitution can range from monosubstitution to multisubstitution.

The ion conducting group containing polymers of the present invention comprise repeating units of Formula I in optional combination with repeating units set forth under Formula II defined above. Optionally, the ion conducting group containing polymers of the present invention can include in addition to the repeating units defined under Formula I and/or Formula II, one or more repeating units polymerized from acrylic acid, methacrylic acid, maleic acid, itaconic acid, citraconic anhydride, itaconic anhydride, maleic anhydride, and linear and branched ($C_1$-$C_5$) alkyl esters of acrylic acid, and sulfur dioxide.

When latent crosslinking of the polymer is desired, at least a portion of the polycyclic repeating units of the polycyclic backbone of embodiments of the present invention contain pendant latent crosslinkable groups. Latent crosslinkable groups are incorporated into the polymer backbone by copolymerizing a polycycloolefin monomer containing a pendant latent crosslinking group or moiety into the polymer. These monomers are characterized by being readily copolymerizable with the other monomers of the invention, and also by being capable of curing (i.e., crosslinked), generally in the presence of a catalyst, by means of heat and/or radiation. Crosslinkable ion conducting group containing polymers can be provided, for example, by including a co-repeating unit that contains a crosslinkable functional group. Suitable crosslinkable functional groups include but are not limited to the pendant alkenyl, alkylidenyl, carboxylic acid, hydroxyl, trialkoxysilyl, acrylate cinnamate and epoxy moieties that are represented by substituents $R^5$ to $R^8$ defined under Formulae II and IIA. Representative crosslinkable moieties are set forth but not limited to the moieties under Formula IIA. The polymers are crosslinked subsequent to polymerization and functionalization (latent crosslinking) by effecting a crosslinking reaction between co-reactive crosslinkable moieties.

In some embodiments of the invention, the polymers suitable for use in the polymer compositions comprise from about 95 to about 5 mole % (based on the total mole % of the repeating units contained in the polymer backbone) of at least one polycyclic repeating unit defined under Formula I and from about 5 to about 95 mole % of at least one polycyclic repeating unit defined under Formula II. In other embodiments of the invention, the polymer comprises from about 80 to about 20 mole % of at least one polycyclic repeating unit defined under Formula I and from about 20 to about 80 mole % of at least one polycyclic repeating unit defined under Formula II. In yet another embodiment, the polymer comprises from about 70 to about 30 mole % of at least one polycyclic repeating unit defined under Formula I and from about 30 to about 70 mole % of at least one polycyclic repeating unit defined under Formula II. In still another embodiment, the polymer comprises from about 60 to about 40 mole % of at least one polycyclic repeating unit defined under Formula I and from about 40 to about 60 mole % of at least one polycyclic repeating unit defined under Formula II. In still another embodiment, the polymer comprises from about 20 to about 60 mole % of at least one polycyclic repeating unit defined under Formula I and from about 40 to about 80 mole % of at least one polycyclic repeating unit defined under Formula II. In another embodiment of the invention, the polymer comprises from about 1 to about 10 mole % of a repeating unit polymerized from a monomer selected from acrylic acid, methacrylic acid, maleic acid, itaconic acid, citraconic anhydride, itaconic anhydride, maleic anhydride, and linear and branched ($C_1$-$C_5$) alkyl esters of acrylic acid, sulfur dioxide, and mixtures thereof. It will be evident to one of ordinary skill that when the repeating units derived from these monomers are in the polymer backbone that the mole % of one or both of the repeating units set forth under Formulae I and II will be reduced accordingly. In other words, the total mole percentage of repeating units set forth under Formulae I and II in optional combination with the other repeating units set forth immediately above, can not exceed 100 mole %.

Repeating units of Formulae II and IIA that contain latent crosslinkable groups are present in the backbone in a sufficient amount to enhance the mechanical, physical, and chemical properties of the polymer as well as films and membranes produced therefrom. The amount (in terms of mole %) of repeating units containing the pendant crosslinkable moieties present in the copolymer backbone must be sufficient to result in a crosslink density adequate to achieve the desired membrane properties. Determining this amount of crosslinkable repeating units needed to achieve the desired membrane properties can be easily determined by routine experimentation. However, for illustrative purposes, some embodiments of the present invention can contain a range of from about 1 to about 50 mole % (based on the total mole % of the repeating units contained in the polymer backbone) of a repeating unit containing a crosslinkable moiety. In other embodiments, the amount of the repeating unit containing the crosslinkable moiety present in the polymer backbone ranges from about 1 to about 20 mole %. In yet other embodiments in accordance with the present invention, the amount can range from about 1 to about 10 mole %.

Latent Crosslinking

The latent crosslinkable pendant groups can be reacted via a variety of chemistries known to initiate the reaction of selected functional groups. While it is generally advantageous to initiate crosslinking of the latent crosslinkable pendant groups of polymer embodiments of the present invention thermally, in some embodiments of the invention, a crosslinking reaction is initiated by a photochemically generated free radical initiator. In other embodiments, the latent crosslinking reaction is initiated by a thermally generated acid (thermoacid generator or TAG). In a further embodiment of the invention, the crosslinking reaction is initiated by a photoacid generator. In yet a further embodiment, combinations of the thermally and photochemically generated free radical initiator (TAG and PAG) crosslinking agents can be utilized to effect polymer crosslinking. In another embodiment, polymers containing pendant silyl groups can be crosslinked by a hydrolysis reaction. In yet another embodiment, polymers containing pendant carboxylic acid and hydroxy groups can be crosslinked via transesterification. In a further embodiment, polymer chains containing pedant sulfonic acid containing moieties can be spontaneously crosslinked by heating the polymers to effect a hydrolysis reaction between respective sulfonic acid moieties. In a still further embodiment of the invention, a diamine or diol crosslinking agent is utilized to crosslink the instant polymers that contain co-reactive functional groups. By thermally induced is meant that the initiator is inert until its decomposition temperature is reached. Upon reaching the decomposition temperature a free radical initiator or a strong free acid is formed to initiate or catalyze the crosslinking reaction. By photo-chemically induced is meant that a free radical initiator or strong acid is generated upon exposure to a radiation source.

The thermally and photochemically activated crosslinking agents are employed to induce the crosslinking reaction between two mutually reactive groups that are pendant from the same or different polymer chains. For example, the alkenyl (any group containing carbon-carbon unsaturation), cycloalkenyl, and alkylidenyl groups can be crosslinked via a free radical mechanism in the presence of the photo and thermally activated free radical crosslinking agents. The alkoxysilyl groups can be crosslinked with each other in the presence of moisture at elevated temperature via a hydrolysis reaction mechanism. Epoxy groups can be reacted together in the presence of a TAG or PAG generated acid resulting in an ether linkage.

Carboxyl and hydroxyl moieties can be crosslinked in the presence of a strong acid ($H_2SO_4$) or base (KOH) via transesterification, resulting in an ester linkage.

Suitable thermally induced free radical thermal initiators for crosslinking pendant unsaturated moieties include organic peroxides and aliphatic azo compounds. The aliphatic azo compounds are suitable initiators for the thermal and photo activated crosslinking embodiments of the invention, while the organic peroxides are suitable for use as thermally activated initiators only.

The thermal crosslinking reaction is initiated by a thermal curing agent which generates an acid upon thermal activation. The thermally generated acid in turn catalyzes the crosslinking reaction of the epoxy functionality. The thermal curing agents or thermal acid generators include many of the PAGs set forth above. In addition to photo-activation, it is well known that PAGs can be activated at elevated temperatures. Generally, the activation temperatures range from about 25° C. to about 250° C. Suitable thermal acid generators include the onium salts set forth above. It should be apparent to those skilled in the art that any thermally activated initiator can be employed so long as it is capable of initiating a crosslinking reaction of the crosslinkable functionality on the polymer backbone. Examples of such thermal curing agents or thermal acid generators include, but are not limited to, imidazoles, primary, secondary and tertiary amines, quaternary ammonium salts, anhydrides, polysulfides, polymercaptans, phenols, carboxylic acids, polyamides, quaternary phosphonium salts, and combinations thereof. Suitable thermal curing agents are set forth in *Chemistry and Technology of Epoxy Resins*, Chapman & Hall, Bury St. Edmunds, England, 1993, pp. 37-71, B. Ellis, editor.)

The organic peroxide initiators include but are not limited to dibenzoyl peroxide, di(2,4-dichlorobenzoyl) peroxide, diacetyl peroxide, diisobutyryl peroxide, dilauroyl peroxide, t-butylperbenzoate, t-butylperacetate, 2,5-di(benzoylperoxy)-1,2-dimethylhexane, di-t-butyl diperoxyazelate, t-butyl peroxy-2-ethylhexanoate, t-amyl peroctoate, 2,5-di(2-ethylhexanoylperoxy)-2,5-dimethylhexane, t-butylperoxyneodecanoate, ethyl 3,3-di(t-butylperoxy)butyrate, 2,2-di(t-butylperoxy)butane, 1,1-di(t-butylperoxy)cyclohexane, 1,1-di(t-butylperoxy)-3,3,5-trimethylcyclohexane, 2,5-di(t-butylperoxy)-2,5-dimethylhex-3-yne, di-t-butyl peroxide, 2,5-di(t-butylperoxy)-2,5-dimethylhexane, dicumyl peroxide, n-propyl peroxydicarbonate, i-propyl peroxydicarbonate, cyclohexyl peroxydicarbonate, and acetyl peroxydicarbonate.

The azo initiators include but are not limited to 2,2'-azobis [2,4-dimethyl]pentane, 2-(t-butylazo)-4-methoxy-2,4-dimethylpentanenitrile, 2,2'-azobis(1-butyronitrile), 2-(t-butylazo)-2,4-dimethylpentanenitrile, 2-(t-butylazo)i-butyronitrile, 2-(t-butylazo)-2-methylbutanenitrile, 1,1-azobis-cyclohexanecarbonitrile, 1-(t-amylazo) cyclohexanecarbonitrile, and 1-(t-butylazo) cyclohexanecarbonitrile.

In one latent crosslinking embodiment of the invention, polymer chains having pendant sulfonic acid containing moieties are crosslinked with diamine and diol crosslinking agents. In this embodiment a TAG or PAG initiator is not necessary to initiate the crosslinking reaction. The diamine or diol crosslinking agent is added to the sulfonic acid containing polymer in a sufficient amount to crosslink the polymer. The crosslinking reaction is initiated by applying a heat to the polymer composition to initiate hydrolysis between respective sulfonic acid groups on the polymer and the amine or hydroxy groups of the diamine or diol crosslinking agent. Suitable diamine and diol crosslinking agents are represented by the formulae: $H_2N-D-NH_2$ and HO-D-OH, wherein D represents a substituted or unsubstituted alkylene group containing 1 to 10 carbon atoms or a substituted or unsubstituted aryl group. Representative alkylene groups include methylene, ethylene, propylene and butylene. Representative aryl groups include phenyl, naphthyl, and anthracenyl. In one embodiment of the invention, D is phenylene wherein the amino or diol moieties are situated in the meta or para positions on the ring.

An exemplary crosslinking reaction is schematically represented as follows:

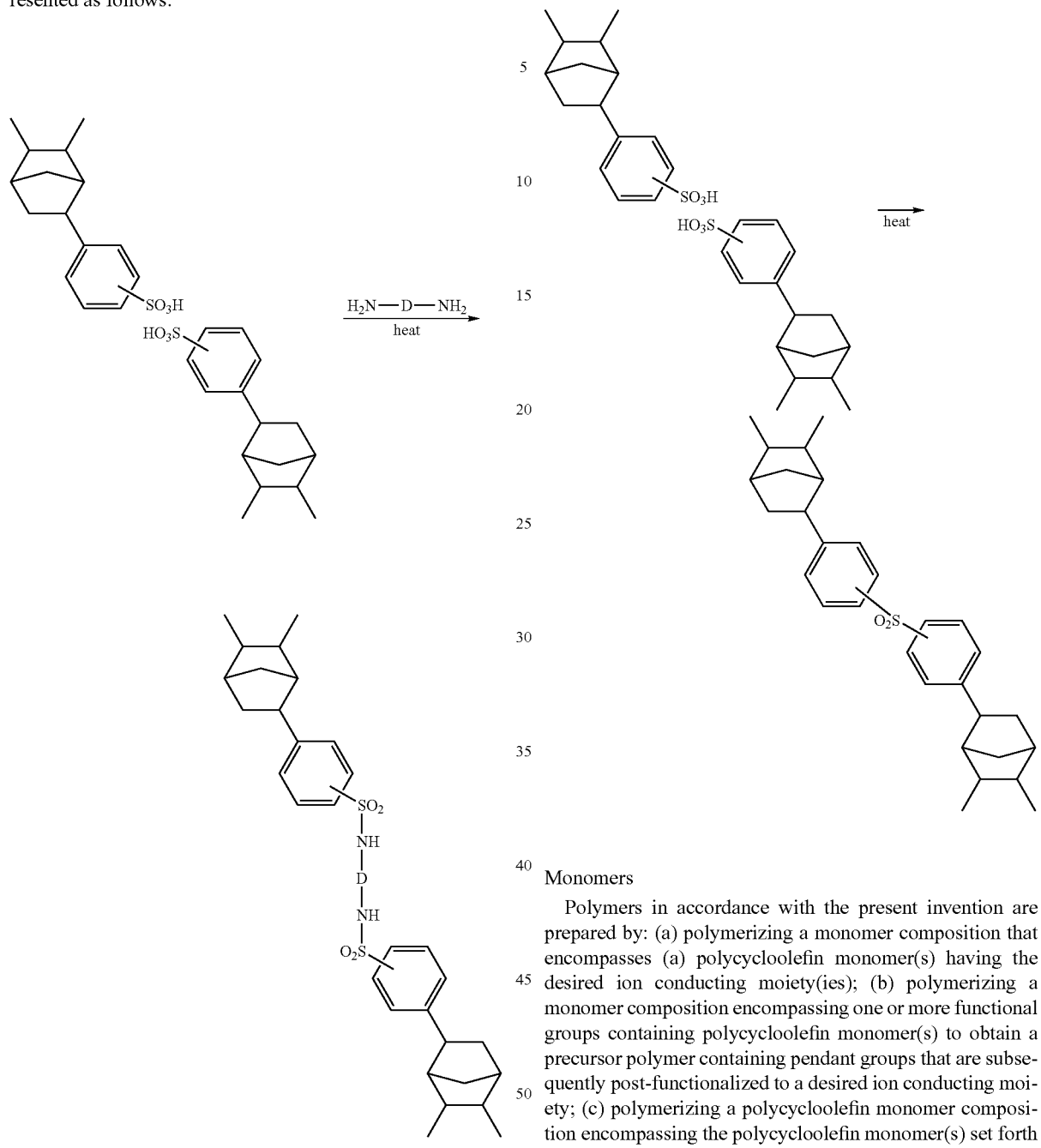

wherein D is as defined above.

The polymers of the invention that contain pendant sulfonic acid containing moieties can also be crosslinked through the hydrolysis of two sulfonic acid groups that are in proximity to one another. The hydrolysis reaction is initiated by applying a sufficient amount of heat to the polymer composition, such as is shown below:

Monomers

Polymers in accordance with the present invention are prepared by: (a) polymerizing a monomer composition that encompasses (a) polycycloolefin monomer(s) having the desired ion conducting moiety(ies); (b) polymerizing a monomer composition encompassing one or more functional groups containing polycycloolefin monomer(s) to obtain a precursor polymer containing pendant groups that are subsequently post-functionalized to a desired ion conducting moiety; (c) polymerizing a polycycloolefin monomer composition encompassing the polycycloolefin monomer(s) set forth in monomer compositions (a) and (b) to obtain a precursor polymer that is subsequently post-functionalized to contain additional ion conducting moieties; and (d) polymerizing a monomer composition that encompasses the polycycloolefin monomer composition set forth in (a), (b) or (c) in combination with a monomer selected from (meth)acrylic acid and linear and branched ($C_1$-$C_5$) alkyl esters of acrylic acid, maleic anhydride and sulfur dioxide, and mixtures thereof. It will be understood that generally, ion conducting moieties are too reactive to allow for direct polymerization, therefore most polymerizations encompass monomers with protected ion conducting pendant groups or such groups are created after polymerization. Examples of such post-functionalization are provided herein below.

In some embodiments of the invention, the polymerizable polycycloolefin monomer composition set forth in (a) encompasses one or more monomers represented by Formula Ia below:

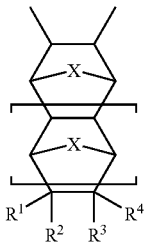

Ia wherein X and n are as previously defined; $R^1$ to $R^4$ independently represent a substituent selected from hydrogen, linear and branched ($C_1$ to $C_{20}$) alkyl, linear and branched ($C_1$ to $C_{20}$) haloalkyl, subject to the proviso that at least one of $R^1$ to $R^4$ must represent a pendant ion conducting moiety and salts thereof selected from the formulae:

-(A)$_q$-(SO$_3$H)$_r$

-(A)$_q$-OP(O)(OH)(OR)

-(A)$_q$-P(O)(OH)(OR)

—(CH$_2$)$_n$C(O)OH wherein A is a spacer moiety represented by —(CH$_2$)$_m$—, —(CH$_2$)$_m$O—, —(CH$_2$)$_m$O(CH$_2$)$_m$—, —O(CH$_2$)$_m$—, —(CH$_2$)$_m$NR$^{15}$(CH$_2$)$_m$—, —(CH$_2$)$_m$-aryl-, —O(CH$_2$)$_m$-aryl-, —(CH$_2$)$_m$O(CH$_2$)$_m$-aryl-, -(aryl)$_m$-(aryl)$_m$-aryl-O(CH$_2$)$_m$—, and -aryl-NR$^{15}$(CH$_2$)$_m$—, wherein q, m, r, aryl, R and $R^{15}$ are as previously defined.

In another embodiment of the invention, the polymerizable polycycloolefin monomer composition set forth in (b) encompasses one or more monomers independently selected from a monomer represented by Formula IIa below:

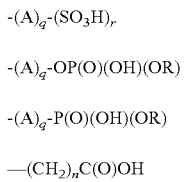

IIa wherein X, n, and $R^5$ to $R^8$ are as previously defined.

In a further embodiment, the polymerizable polycycloolefin monomer composition set forth in (c) encompasses one or more monomers independently selected from a monomer represented by Formula IA in combination with one or more monomers independently selected form a monomer represented by Formula IIa.

In a still further embodiment in accordance with the present invention, the polymerizable monomer composition encompasses one or more polycycloolefin monomers selected from a monomer represented by (i) Formula Ia; (ii) Formula IIa; and (iii) Formula Ia and Formula IIa; all in combination with a monomer selected from acrylic acid, methacrylic acid, maleic acid, itaconic acid, citraconic anhydride, itaconic anhydride, maleic anhydride, and linear and branched ($C_1$-$C_5$) alkyl esters of acrylic acid, and sulfur dioxide, and mixtures thereof.

Embodiments of present invention provide the capability of tailoring polymers to impart specific properties to membranes fabricated from the polymers. In particular, the polycyclic polymers of the present invention may contain only one type of ion conducting functional group or any combination of ion conducting functional groups with other functional groups that impart the ability to crosslink or to make the polymer more hydrophilic. For example, monomers having ion conducting functionalities can be polymerized with monomers having crosslinkable functionalities and with monomers that contain functionalities that can be later modified (post-functionalized) to desired functionalities, thereby providing a polymer having all three functionalities. The overall composition of the polymer can be easily adjusted by changing the type and the relative proportions of the variously functionalized monomers.

Mixtures of monomer and additives can be used to further tailor the polymer composition. Upon polymerization, the monomers participate in the polymerization reaction to form a polymer, while electrolyte additives without polymerizable functionalities do not. This results in an intimately mixed composite material of polymer and additive. The additive can be a plasticizer to help improve the mechanical properties of the polymer or dopants to improve the conductivity of the polymer. Exemplary dopants are phosphoric acid, various phosphonates, and heteropolyacids such as $H_3Mo_{12}PO_{40}H_2O$). The additives can be added in the polymerization medium as describe above or be added to the polymer membrane casting solution.

The polycycloolefin monomers in accordance with the present invention can be obtained commercially or easily synthesized via well known synthesis routes. Illustratively, an economical route for the preparation of hydrocarbyl substituted and many functionally substituted polycyloolefin monomers relies on the Diels-Alder addition reaction in which cyclopentadiene (CPD) or substituted CPD is reacted with a suitable dienophile at elevated temperatures to form the substituted norbornene-type adduct generally shown by the following reaction scheme:

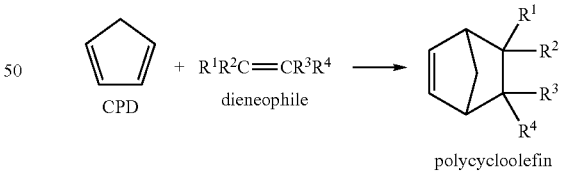

$R^1$ to $R^4$ independently represent hydrogen, hydrocarbyl, or any functional group, such as, for example, the R groups previously described under $R^1$ to $R^8$. In cases where the desired functional substituent can not be directly synthesized via the Diels-Alder reaction, a polycycloolefin containing a precursor substituent that can be synthesized via the Diels-Alder process and subsequently reacted with a reactant to give the desired functional group. CPD is economically obtained by the pyrolysis of dicyclopentadiene (DCPD).

Higher polycycloolefin adducts can be prepared by the thermal pyrolysis of dicyclopentadiene (DCPD) in the presence of a suitable dienophile. The reaction proceeds by the initial pyrolysis of DCPD to CPD followed by the Diels-Alder addition of CPD and the dienophile to give the adduct shown below:

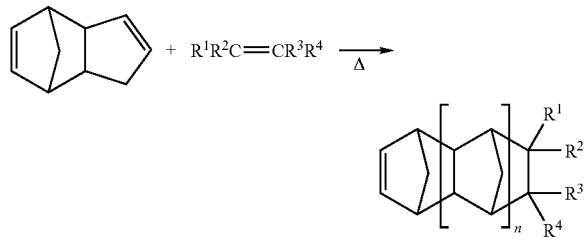

In the above formula, n represents the number of bicyclic units in the monomer, and $R^1$ to $R^4$ are as described immediately above. The number of bicyclic units (n) in the monomer can be increased by allowing the Diels-Alder adduct to further react with additional CPD units.

Olefinic polycycloolefins containing fused ring sultones and sultams (i.e., sultones and sultams formed by $R^6$ and $R^7$ taken together with the two ring carbon atoms contributed by the polycyclic moiety) can be prepared via the Diels-Alder reaction of CPD with an olefinic sultone/sultam exemplified as follows:

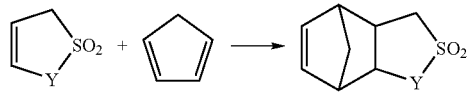

wherein Y represents an oxygen and nitrogen atom.

Other synthesis methods for obtaining the fused ring sultones and sultams are described in *Synthesis and Diels-Adler reactions of α,β-unsaturated γ-sultone*; Albert W. Lee et al., Chemical. Communications (Cambridge), 1997, 6; 611-612; *Synthesis and Diels-Alder reactions of prop*-1-*ene*-1,3-*sultone, and chemical transformations of the Diels-Alder adducts*, La Sheng Jiang et al., Tetrahedron Letters, 1999, 55(8), 2245-2262; and *Synthesis and Diels-Alder reactions of unsaturated sultams*, K. F. Ho et al., Tetrahedron Letters, 2001, 42(17), 3121-3124.

Pendent sultone moieties can be prepared by the Diels-Alder synthesis route by reacting CPD with an alkenyl sultone as shown schematically below:

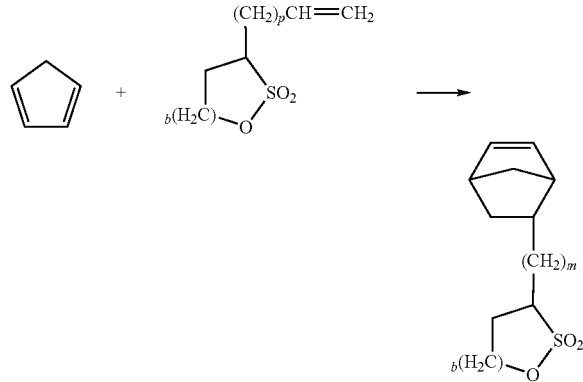

Alkenyl sultones can be synthesized by reacting a sultone with an alkyllithium (e.g., n-butyllithium) followed by the addition of an alkenyl bromide (e.g., allylbromide) to yield the desired alkenyl sultone. Such reaction is schematically represented below:

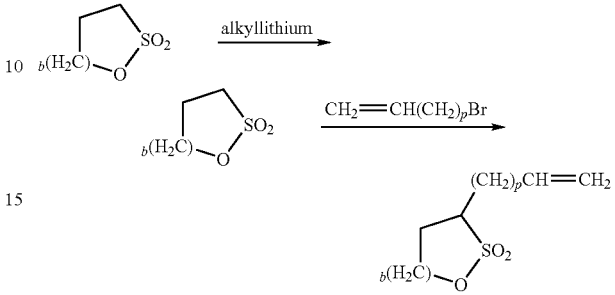

wherein p is 0 to 6 and b is as previously defined.

Polymerization of Monomers

The polycyclic monomer compositions set forth under (a), (b), (c), and (d) above can be prepared by vinyl-addition polymerization in the presence of a single or multi-component Group VIII transition metal catalyst or a free radical catalyst initiator. In one embodiment of the invention the Group VIII transition metal catalysts employ nickel and palladium compounds. Such catalysts are disclosed in U.S. Pat. Nos. 6,136,499; 6,303,724; and 6,455,650, the disclosures of which are hereby incorporated by reference. Free radical polymerization techniques are generally set forth in the *Encyclopedia of Polymer Science*, John Wiley & Sons, 13, 708 (1988). More specifically, free radical copolymerization of cyclic olefins and maleic anhydride (COMA type resins) have been disclosed in the literature by U. Okoroanyanwu, et. al., *Proc. SPIE*, 92, 3049 (1997).

Generally, in a free radical polymerization process, the monomers are polymerized in a solvent at an elevated temperature (about 50° C. to about 150° C.) in the presence of a free radical initiator. Suitable initiators include but are not limited to azo compounds and peroxides. Examples of free radical initiators are azobisisobutyronitrile (AIBN), benzoyl peroxide, lauryl peroxide, azobisisocapronitrile, azobisisovaleronitrile and t-butylhydroperoxide.

In one embodiment of the invention the free radical catalyst initiators are particularly useful when polymerizing the polycycloolefin monomers set forth under Formula Ia and/or Formula IIa in combination with a monomer selected from acrylic acid, methacrylic acid, maleic acid, itaconic acid, citraconic anhydride, itaconic anhydride, maleic anhydride, and linear and branched ($C_1$-$C_5$) alkyl esters of acrylic acid, sulfur dioxide, and mixtures thereof.

It will be recognized that when it is desired to incorporate latent crosslinking moieties into the polymer backbone via free radical polymerization, care should be taken not select monomers that contain pendant free radically polymerizable carbon-carbon unsaturation, as the polymer will crosslink during the free radical polymerization reaction.

Advantageously, polymers in accordance with the present invention are tailorable in that a myriad of functional groups (in addition to combinations of different ion conducting groups) can be readily incorporated into the polymer backbone. For example, if a backbone with more hydrophilic character is desired, monomers that contain hydrophilic groups (e.g., carboxylic acids, diacids, and protected acids) are easily polymerized into the polymer.

Nickel containing catalysts useful for making the polymers utilized in this invention are represented by the formula:

$$E_jNi(C_6F_5)_2$$

wherein j is 1 or 2 and E represents a neutral 2 electron donor ligand. When j is 1, E preferably is a pi-arene ligand such as toluene, benzene, and mesitylene. When j is 2, E is preferably selected from diethyl ether, tetrahydrofuran (THF), ethyl acetate (EtOAc) and dioxane. The ratio of monomer to catalyst in the reaction medium can range from about 5000:1 to about 50:1 in some embodiments of the invention, and in other embodiments at a ratio of about 2000:1 to about 100:1. The reaction can be run in a suitable solvent at a temperature range from about 0° C. to about 70° C. In some embodiments, the temperature can range from about 10° C. to about 50° C., and in other embodiments from about 20° C. to about 40° C. Exemplary catalysts of the above formula are (toluene)bis (perfluorophenyl) nickel, (mesitylene)bis(perfluorophenyl) nickel, (benzene)bis(perfluorophenyl) nickel, bis(tetrahydrofuran)bis(perfluorophenyl) nickel, bis(ethyl acetate)bis(perfluorophenyl) nickel and bis(dioxane)bis(perfluorophenyl) nickel.

Palladium containing catalysts useful for making the polymers utilized in this invention can be prepared as a preformed single component catalyst or prepared in situ by admixing a palladium containing procatalyst with an activator in the presence of the desired monomer(s) to be polymerized.

The preformed catalyst can be prepared by admixing the catalyst precursors such as a procatalyst and activator in an appropriate solvent, allowing the reaction to proceed under appropriate temperature conditions, and isolating the reaction product a preformed catalyst product. By procatalyst is meant a palladium containing compound that is converted to an active catalyst by a reaction with a cocatalyst or activator compound. The description and synthesis of representative procatalysts and activator compounds are set forth in U.S. Pat. No. 6,455,650, supra.

Some palladium procatalysts suitable for the polymerization of the monomers of the invention are represented by the formula:

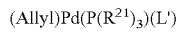

$$(Allyl)Pd(P(R^{21})_3)(L')$$

wherein $R^{21}$ is selected from isopropyl and cyclohexyl; and L' is selected from trifluoroacetate, and trifluoromethanesulfonate (triflate). Representative procatalyst compounds in accordance with such formula are (allyl)palladium(tricyclohexylphosphine)triflate, (allyl)palladium(triisopropylphosphine)triflate, (allyl)palladium(tricyclohexylphosphine)trifluoroacetate, and (allyl)palladium(triisopropylphosphine)trifluoroacetate.

Representative activator compounds are selected from lithium tetrakis(pentafluorophenyl) borate (LiFABA) and N,N-dimethylaniliniumtetrakis(pentafluorophenyl) borate (DANFABA).

In another embodiment of the invention, a palladium compound, $Pd(OC(O)CH_3)$, a phosphine compound, and the activators, LiFABA or DANFABA, referred to above can be mixed in situ with the desired monomer(s) to be polymerized. Representative phosphine compounds are phosphines such as tricyclohexylphosphine and triisopropylphosphine.

In one embodiment of the invention, the molar ratio of palladium procatalyst (based on the palladium metal) to activator is 1 to 2. In another embodiment, the ratio is 1 to 4, and in another embodiment the ratio is 1 to 1. It should be noted that the order of addition of the various catalyst components mentioned above to the reaction medium is not important.

The palladium catalysts in accordance with the present invention exhibit a high activity at monomer to procatalyst molar ratios (i.e., monomer to palladium metal) of over 100,000:1. In some embodiments of the invention, monomer to procatalyst ratios can range from about 100,500:1 to about 1,000,000:1. In other embodiments, from about 110,000:1 to about 500,000:1, and in still other embodiments from about 120,000:1 to about 250,000:1. While these catalysts have been found to be active at monomer to catalyst metal molar ratios of over 100,000:1, it should be recognized that it is within the scope of this invention to utilize monomer to catalyst metal molar ratios of less than 100,000:1. Depending on the activity of a particular catalyst, the reactivity of a certain monomer, the desired molecular weight, or desired polymer backbone tacticity, higher concentrations of catalyst to monomer loading are well within the scope of the present invention (i.e., monomer to catalyst loadings of 50:1 to 99, 999:1).

The copolymerization of cyclic olefin monomers with acrylate type monomers using palladium type catalysts is disclosed in published U.S. Patent Application No. 20040063885 by L. Rhodes, et. al., entitled Photo-imageable compositions of norbornene and acrylate copolymers and use thereof, and assigned to Sumitomo Bakelite Co. Ltd., and Penn State Research Corporation, pertinent parts of which are incorporated herein by reference.

While exemplary free radical, nickel and palladium type initiators/catalysts have been described herein, it will be understood that such are illustrative and are not intended to limit the scope of such initiators or catalysts that are within the scope and spirit of the present invention.

Suitable polymerization solvents for the free radical and vinyl addition polymerization reactions include hydrocarbon and aromatic solvents. Exemplary hydrocarbon solvents include but are not limited to alkanes and cycloalkanes such as pentane, hexane, heptane and cyclohexane. Exemplary aromatic solvents include but are not limited to benzene, toluene, xylene and mesitylene. Other organic solvents such as diethyl ether, tetrahydrofuran, acetates (e.g., ethyl acetate), esters, lactones, ketones and amides are also useful. Mixtures of one or more of the foregoing solvents can be utilized as a polymerization solvent.

In the free radical polymerization of the monomers of the invention, molecular weight can be controlled by changing the initiator to monomer ratio and/or the polymerization reaction time. When utilizing the vinyl-addition nickel and palladium catalysts disclosed above, the molecular weight of the polymer can be controlled by employing a chain transfer agent disclosed in U.S. Pat. No. 6,136,499 the disclosure of which is incorporated herein by reference. In one embodiment of the invention, α-olefins, (e.g., ethylene, propylene, 1-hexene, 1-decene, 4-methyl-1-pentene) and cyclohexene are suitable as molecular weight control agents.

In one embodiment of the invention, the polymers have a weight average molecular weight of from about 10,000 to about 1,000,000, in another embodiment from about 80,000 to about 300,000, and in still another embodiment from about 100,000 to about 125,000. Molecular weights of the polymers obtained were measured by use of gel permeation chromatograph (GPC) using polynorbornene standards (A modification of ASTM D3536-91). Instrument: Alcot 708 Autosampler; Waters 515 Pump; Waters 410 Refractive Index Detector. Columns: Phenomenex Phenogel Linear Column (2) and a Phenogel $10^6$ Å Column (all columns are 10 micron packed capillary columns). Samples are run in monochlorobenzene. The absolute molecular weight of the polynorbornene standards was generated utilizing a Chromatics CMX 100 low angle laser light scattering instrument.

Polymer Functionalization

In some embodiments of the invention, the polycyclic polymers that encompasses one or more of the repeating units polymerized from the polycycloolefin monomer compositions described under (a), (b), (c), and (d) above can be post-functionalized (derivatized) to obtain a polymer containing recurring pendant ion conducting groups. In some embodiments, the polycyclic polymer (i.e., the precursor polymer) must contain a functional group that can be chemically derivatized to obtain a desired ion conducting group.

In another embodiment of the invention, a selected pendant moiety containing an aryl group, a hydroxyl group, a primary and secondary amino group, or a fused ring and/or pendant sultone/sultam can be derivatized in the presence of an appropriate sulfonating agent or hydrolysis reagent to obtain a sulfonic acid ion conducting moiety. In one representative embodiment, a polycyclic polymer that encompasses a repeating unit containing a fused ring sultone or a fused ring sultam can be hydrolyzed in the presence of a base to yield a pendant sulfonic acid group as schematically represented below:

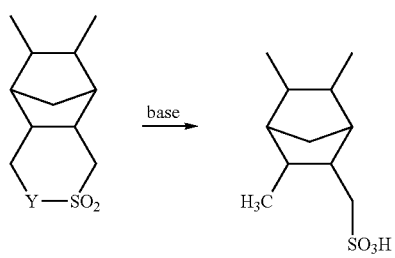

wherein Y represents oxygen (sultone) and the heteroatom group —NR— (sultam) and R is as previously defined. When hydrolyzing the fused ring sultone moiety to the respective sulfonic acid group, the polycyclic polymer containing the fused sultone repeating unit is dissolved in an appropriate solvent (e.g., toluene or THF) and a stoichiometric amount of base (e.g., sodium hydroxide), is used as the hydrolysis reagent. By stoichiometric amount is meant the amount of base required to hydrolyze (ring-open) the sultone ring to form the respective sulfonic acid group. When conducting the hydrolysis of the fused sultam to the respective sulfonic acid group, an excess amount of base is utilized in order to completely hydrolyze the sulfonamide functionality to the sulfonic acid. Otherwise, the amine group on the sulfonamide functionality will remain intact requiring additional base to completely hydrolyze the sulfonamide to the sulfonic acid group.

In another embodiment of the invention, a polycyclic polymer that encompasses a repeating unit containing a pendant sultone or sultam can be hydrolyzed to the sulfonic acid as described for the fused ring embodiments disclosed above. In another embodiment, the pendant sultone can be hydrolyzed and then derivatized in the presence of an alkali metal ($C_1$-$C_5$) alkoxide (e.g., sodium ethoxide), followed by hydrochloric acid to yield a derivatized sulfonic acid moiety, as shown below:

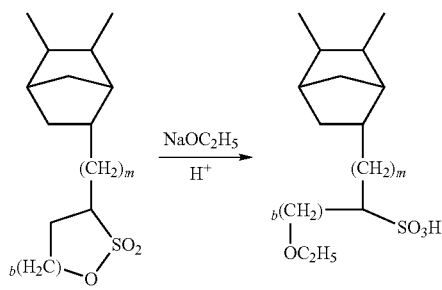

When hydrolyzed in the presence of a stronger base such as aqueous sodium hydroxide followed by acidification using hydrochloric acid, the pendant sultone moiety ring-opens to yield a hydroxyl derivatized sulfonic acid moiety as shown in the reaction scheme below:

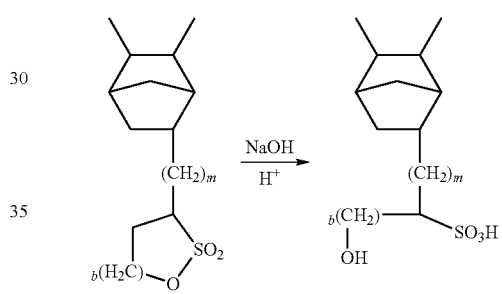

In the above reaction schemes b and m are as previously defined.

In other embodiments of the invention, polycyclic polymers that encompasses repeating units containing pendant hydroxyl moieties or primary and secondary amine moieties can be derivatized by reacting a substituted or unsubstituted sultone with these moieties in the presence of a base (e.g., sodium hydride), yielding a sulfonic acid group. The sultone can contain 3 to 6 carbon atoms.

The reactions are schematically represented below:

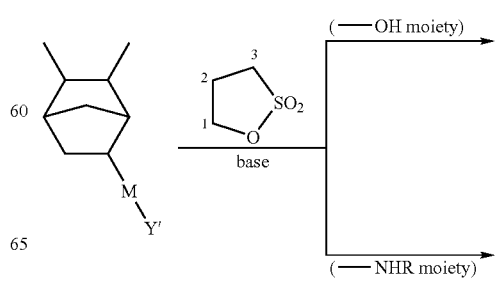

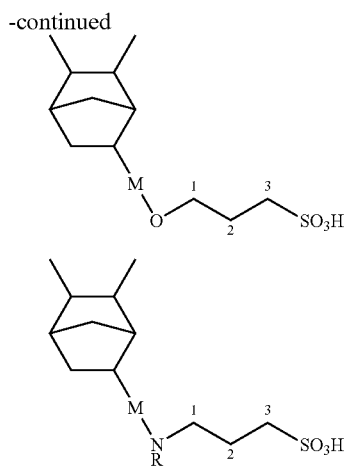

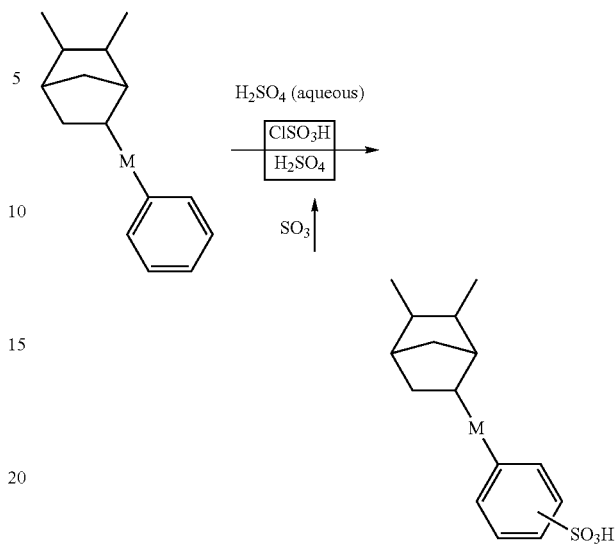

In the structures represented immediately above, Y' represents hydroxyl group and a primary and secondary amine group represented by the radical —NHR, M represents a divalent bridging moiety selected from any of the hydroxyl and primary and secondary amine containing moieties set forth in the disclosure herein, and R is as previously defined. It should be noted that the carbon atoms in the sultone ring (noted by numbering) can optionally be substituted as described hereinabove. In some embodiments of the invention the carbon atoms can be substituted with fluorine. In other embodiments of the invention, a hydroxy containing moiety can be derivatized via a substitution reaction wherein the hydroxy group is replaced by chlorine by a reaction with thionyl chloride, followed by reacting the chlorinated substituent with a sulfonation reagent (e.g., sodium sulfite) to yield a sulfonic acid derivative according to the following reaction scheme:

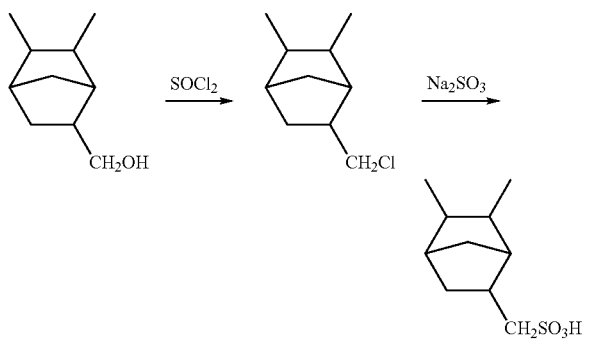

In still another embodiment, repeating units containing pendant hydroxy moieties can be reacted with sulfoacetic acid to obtain the corresponding sulfonic acid moiety as set forth in U.S. Pat. No. 6,523,699.

In a further embodiment of the invention, polycyclic polymers that encompasses repeating units having pendant aryl groups (e.g., phenyl and naphthyl), can be sulfonated in the presence of a sulfonation agent.

Typical sulfonation agents are known in the art and can be selected from concentrated sulfuric acid (75 wt. % to 95 wt. % in $H_2O$), chlorosulfonic acid, and a sulfuric acid/sulfur trioxide reagent. Typical reaction schemes for the sulfonation of pendant aryl groups are set forth below:

wherein M represents a divalent bridging moiety selected from any of the aryl containing moieties set forth in the disclosure herein. In another embodiment a aryloxy (e.g., phenoxy), substituent can be synthesized from the iodomethyl derivative obtained above which derivative is subsequently sulfonated as shown below:

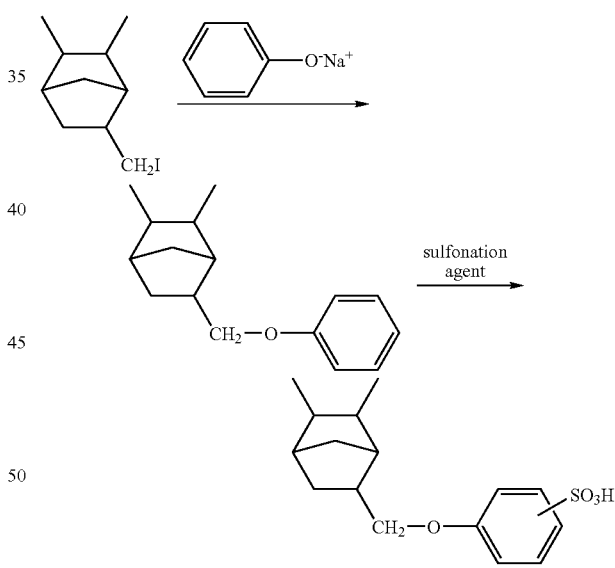

The sulfonation agent can be selected from sulfuric acid (75 wt. % to 95 wt. % in $H_2O$), chlorosulfonic acid, and sulfuric acid/sulfur trioxide as set forth above.

In a further embodiment, polymers containing repeating units having a pendant unsaturated group such as alkylidenyl (e.g., ethylidenyl), vinyl, and alkenyl (e.g., hexyl) groups in accordance with the functionalities described above, can be sulfonated in the presence of sulfur trioxide complexes such as sulfur trioxide N,N-dimethylformamide complex and sulfur trioxide dioxane complex.

In another embodiment of the invention, a polycyclic homopolymer containing recurring pendant methyl acetate groups can be fully or partially derivatized to a hydroxy methyl derivative by treating the methyl acetate containing polymer with a hydroxylation agent, (e.g., aqueous sodium hydroxide with tetrabutyl ammonium bromide). The resultant hydroxy group containing polymer can then be sulfonated to the respective sulfonic acid derivative with any of the sulfonation agents described above. Copolymers containing polycyclic co-repeating units having pendant methyl acetate groups and polycyclic co-repeating units having pendant hydroxy methyl groups can be synthesized by controlling the amount of hydroxylation agent in the reaction. By regulating the stoichiometry of the reaction, the amount of methyl acetate groups that are converted to the hydroxy functionality can be controlled. Accordingly, when the hydroxy groups are derivatized to the sulfonic acid via sulfonation, copolymers having recurring methyl acetate groups and sulfonic acid groups can be obtained, as is schematically represented below:

fonation desired on the polymer backbone. The amount of reagent can range from a slight stoichiometric excess (if all co-reactive functional groups on the backbone are to be sulfonated) to a stoichiometric deficient amount (if the co-reactive functional groups on the backbone are to be partially sulfonated). Exemplary amounts of sulfonating reagent can range from about 0.1 to about 100 mole equivalents (based on the mole equivalents of co-reactive functionality on the polymer backbone). In another embodiment, the amount of sulfonating reagent employed ranges from about 1 to about 20 mole equivalents, and in further embodiment ranges from about 2 to about 5 mole equivalents.

The sulfonation reaction temperature can range from about −20° C. to about 80° C. The reaction is allowed to proceed to completion, which generally can range from 1 minute to about 48 hours. Generally, the sulfonation reaction ranges from about 1 to about 2 hours. Following the sulfonation

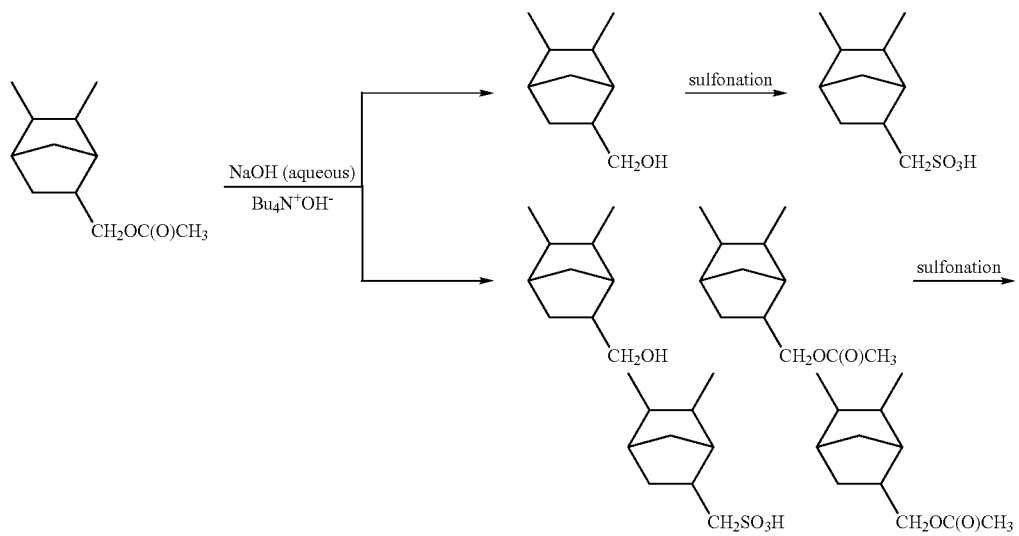

The foregoing post-functionalization reactions are conducted in the appropriate solvent(s) and at the appropriate reaction temperatures. By appropriate solvent is meant that the solvent must be able to solubilize the polymer to be functionalized and not deleteriously interfere with the selected sulfonation reagent. As one of ordinary skill in the art will recognize polymer solubility will depend on a number of factors including the type of functional moiety present on the polymer backbone. Suitable solvents include hydrocarbon solvents, aromatic solvents and chlorinated solvents. Suitable hydrocarbon solvents include but are not limited to alkanes and cycloalkanes such as pentane, hexane, heptane and cyclohexane. Exemplary aromatic solvents include but are not limited to benzene, toluene, xylene and mesitylene. Suitable chlorinated solvents include but are not limited to dichloromethane, chloroform, carbon tetrachloride, ethylchloride, 1,1-dichloroethane, 1,2-dichloroethane, 1-chloropropane, 2-chloropropane, 1-chlorobutane, 2-chlorobutane, 1-chloro-2-methylpropane, and 1-chloropentane, and chlorobenzene. Other organic solvents such as diethyl ether, tetrahydrofuran, anisole, acetates, esters, lactones, ketones, and amides are also useful. In one embodiment of the invention, the reactions are conducted under an inert atmosphere.

The amount of sulfonating agent to employ in the foregoing sulfonation reactions will depend on the amount of sulreaction, the post-functionalized polymer can be precipitated in solvent suitable for isolating the polymer from the reaction medium.

Polymer Membranes

The polycyclic polymers of the present invention containing recurring ion conducting moieties (e.g., pendant sulfonic acid, carboxylic acid, and phosphoric acid groups, combinations thereof and salts thereof), are suitable for use in compositions for casting polymer films and membranes. In one embodiment of the invention, the films find use in fuel cell applications as proton exchange membranes (PEM). Films for use in PEM applications can be produced by conventional methods and known processes. In one embodiment, one or more of the polycyclic polymers each containing one or more of the aforementioned ion conducting moieties is dissolved in a suitable solvent. The polymer solution is optionally filtered and degassed and then spread or coated onto a support where the solvent is removed by heating (soft baking) to a temperature sufficient to evaporate the residual solvent. Heating can occur under vacuum or in an inert atmosphere. The support can be any suitable substrate such as, for example, an electrode (e.g., anode and cathode), a glass or metal sheet, fabric, or a web. The dried polymer film is optionally removed from the substrate and rinsed with deionized water.

In addition to repeating units containing pendant ion conducting groups, other repeating units containing pendant functional groups can optionally be contained in the polymer. For example, repeating units containing carboxylic acid moieties can be incorporated to increase the hydrophilic character of the polymer. Repeating units containing crosslinkable moieties can be polymerized into the backbone and subsequently crosslinked following the casting of the membrane in order to increase the physical integrity of the membrane.

If a crosslinked polymer membrane is desired, a polycyclic polymer containing a crosslinkable moiety(ies) set forth above can be incorporated into the polymer as previously described. The molar amount or number of repeating units containing the crosslinkable groups should be sufficient to prevent the polymer from dissolving in solvent but not exceeding an amount that causes the crosslinked membrane material to become brittle or lose the requisite physical properties. It should also be noted that if latent crosslinking is desired, the crosslinkable moieties that are selected to be polymerized into the polymer backbone should not be sensitive to the sulfonation agent utilized in the post-functionalization step. This avoids the premature crosslinking of the polymer membrane.

The polymer is first isolated from the reaction medium and purified to remove spent catalyst system components. The purified polymer is then dissolved in an appropriate inert solvent. An inert solvent is one that acts only as a carrier for the polymer and is essentially completely removed at some point in the coating or curing process. Suitable inert solvents include hydrocarbon, aromatic and organic solvents. Exemplary hydrocarbon solvents include but are not limited to alkanes and cycloalkanes such as pentane, hexane, heptane and cyclohexane. Exemplary aromatic solvents include but are not limited to benzene, toluene, xylene and mesitylene. Exemplary organic solvents such as diethyl ether, tetrahydrofuran, dimethyl sulfoxide (DMSO), anisole, acetates, esters, lactones, ketones, and amides are also useful. Mixtures of one or more of the foregoing solvents can be utilized so long as they are capable of dissolving the polymer. Additives to enhance the physical properties of the polymer composition can be added as desired. Dopants to increase the conductivity of the membrane can also be added at this point.

In some embodiments of the invention, the polymer solution has polymer solids content of from about 1 to about 50 weight % in solvent (based on the total weight of the polymer and solvent). In one embodiment, the solids content ranges from about 5 to about 30 weight %, and in still another embodiment from about 10 to about 20 wt. %. In some embodiments, solution viscosities can range from about 10 to about 25,000 centipoise (cps). In other embodiments, solution viscosities can range from about 100 cps to about 3000 cps.

Exemplary methods for coating the polymer solution onto a substrate are spin coating, dip coating, brush coating, roller coating, spray coating, solution casting, fluidized bed deposition, extrusion coating, curtain coating, meniscus coating, by doctor blade, and the like. Generally, spin coating and curtain coating are preferred due to their simplicity and high uniformity.

In some embodiments in accordance with the present invention, crosslinking of portions of the polymer film are crosslinked to improve the methanol permeability characteristics or mechanical properties of the membrane. This is accomplished by including into repeat units of the polymer chain that encompass latent crosslinking functional groups that can be activated photochemically, thermally or chemically.

In one embodiment in accordance with the present invention, exposing the polymer film to photon radiation (e.g., electron beam, x-ray, ultraviolet or visible radiation) will initiate the crosslinking reaction. Suitable radiation sources include mercury, mercury/xenon, xenon lamps, KrF laser, x-ray or e-beam.

Following exposure to photon radiation, the coated substrate is subjected to a post-exposure bake cycle. This cycle increases the reaction rate of the crosslinking reaction. The acid species have increased mobility during this cure cycle allowing the acid to find and react with non-crosslinked functionality thereby further enhancing the pattern definition. In one embodiment of the invention, the post-exposure bake is conducted in an oven under inert atmosphere (e.g., nitrogen, argon or helium) at a temperature of from about 50° C. to 200° C. for a period of time between 5 minutes and 60 minutes. In another embodiment, the cure temperature ranges from about 100° C. to about 150° C. for a time period of between 10 minutes and 40 minutes. In still another embodiment, the temperature ranges between 110° C. and 130° C. for a time period of between 15 minutes and 30 minutes.

While several latent crosslinking chemistries have been discussed herein it should be recognized that any suitable crosslinking system can be employed to crosslink the films of the invention so long as it does not deleteriously detract from the operation of the invention.

There are several ways of obtaining sulfonic acid groups in the polymer side chain, three of which, referred to herein as Type I, Type II and Type II are relevant to embodiments of the present invention and are discussed herein below.

Type I:

Ring opening of sultone groups present in the polymer side chain. Synthesis of various monomers that contain sultone groups in the side chain are envisioned. Using transition metal catalysts, one can form soluble copolymers. These copolymers can be converted to the sulfonic acid containing polymers by well known base hydrolysis of the sultone groups followed by acidification as shown in the reaction scheme below:

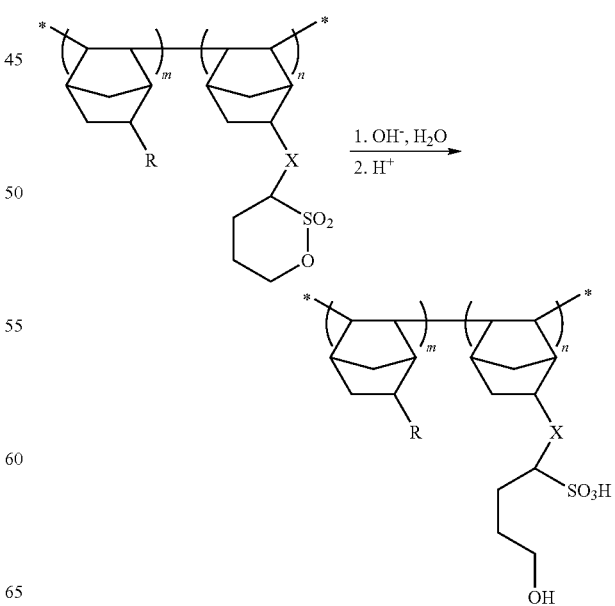

Type II:

Use of a nucleophilic bearing side group (such as an alcohol or amine functional group) to ring open a reactive sultone additive.

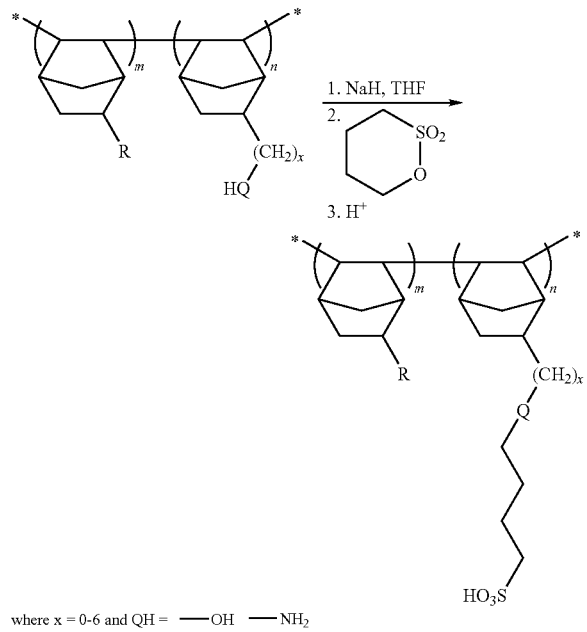

where x = 0-6 and QH = ——OH ——NH₂

Reaction Types I and II typically result in alkylated sulfonic acid functional groups.

Type III:

Sulfonation of homopolymers and copolymers of norbornene monomers that contain aromatic groups. This is accomplished by use of common homogenous and heterogeneous sulfonation reagents. Common sulfonation reagents include sulfuric acid, chlorosulfonic acid, $SO_3$, $SO_3.DMF$, $SO_3.etherate$ and acetyl sulfate.

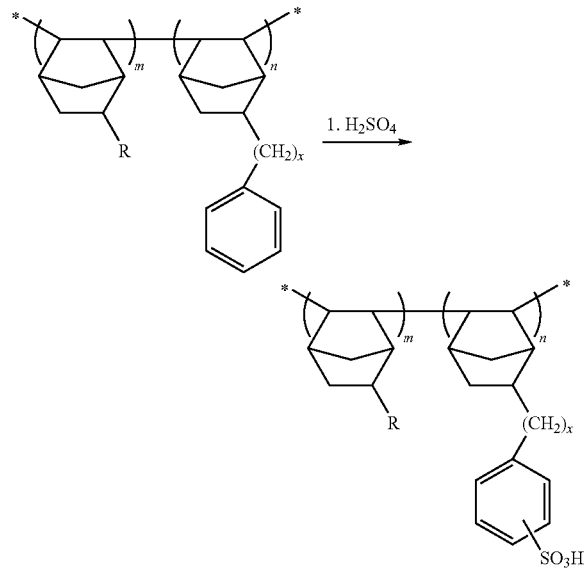

where x = 0-6

Along these lines one can envision using a variety of aromatic monomers to obtain polymers similar to the one described above. The aromatic monomers can be, but not limited to multicyclic species such as naphthyl containing norbornene or biphenyl containing species. Sulfonation of such polymers will likely result in multiple sulfonic acid groups per repeat unit.

Another important composition is the identity of the comonomer that is used along with the aromatic species. In some cases it could be an alkyl chain or it could be a fluorinated (partially or perfluorinated alkyl group) species.

One experienced in the art can envision using combinations of reactions described above, as long as the functional groups and the comonomers are not adversely affected during the process of sulfonation or reaction with the sultone. Combination of reaction types I, II and III will yield polymers that contain both alkylated and aromatic sulfonic acid functional groups.

The following examples are for illustrative purposes and are not intended to limit the invention in any way. Ratios of repeating units incorporated into the polymer backbones are given in molar weight percent.

Type I Examples

Example 1 a) Synthesis of Allyl Sultone

Under nitrogen, atmosphere 1,4-butane sultone (129.4 g, 0.95 mol) was dissolved in anhydrous tetrahydrofuran (1500 ml) in a 500 ml three-necked flask containing a mechanical stir bar. The solution was cooled to −78° C. in a dry ice acetone bath. Under nitrogen, n-butyllithium in pentane (100 ml, 10M) was slowly added over a 30 minute time period wherein some precipitate formed. After stirring for five minutes at −78° C., allylbromide (114.9 g, 0.95 mol) was added over one hour. The obtained clear colorless solution was stirred at −78° C. for two hours. The reaction mixture was poured into a separatory funnel containing ethyl acetate (500 ml), and shaken. The organic phase was separated, washed with brine, dried over magnesium sulfate and evaporated to remove solvent. 80 g (48% yield) of a colorless liquid was obtained. ¹H NMR and ¹²C NMR confirmed the presence of the allyl sultone conforming to the structure:

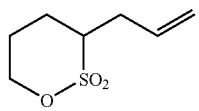

b) Synthesis of NB-CH2-Sultone

Allyl sultone (80 g, 0.45 mol.) as synthesized in the previous example was mixed with dicyclopentadiene (15 g, 0.114 mol.) and charged into a high pressure reactor. The mixture was heated at 180° C. for 6 hours. After this the reactor was cooled and the reaction mixture was drained. The crude material was purified by distillation under vacuum. About 22 g of pure product was obtained. The purity of the monomer was confirmed by gas chromatography and $^1$H NMR analysis confirmed the structure.

c) Copolymerization of NB-CH$_2$-Sultone and NB-MCP

To a glass vial containing a stir bar under argon was placed 2.42 g of NB-CH$_2$-Sultone and 2.20 g of NB-MCP in a 30 wt. % toluene solution. A nickel catalyst solution was prepared in a dry-box by dissolving 0.196 g of (toluene)Ni(C$_6$F$_5$)$_2$ catalyst in 0.8 g of dry toluene. The catalyst solution was added to the monomer via a dry syringe, followed by the addition of 10 g of toluene. The monomer to nickel ratio was 50:1. The reaction mixture was stirred at room temperature for three hours where a dark brown and viscous polymer product was obtained. To the obtained product was added 100 ml of ethyl to dissolve the product. 20 ml of Amberlite® IRC-718 ion exchange resin was added to the solution and stirred overnight at room temperature. The polymer solution was filtered through a 0.22 micron Teflon® filter where a colorless filtrate was obtained. The polymer filtrate solution was concentrated by removing solvent and poured into methanol to precipitate the polymer. A white precipitate formed. The precipitate was placed in a vacuum oven at 70° C. and dried overnight to afford 4.08 g of white polymer powder. $^1$H NMR analysis confirmed the presence of a copolymer having repeating units conforming to structures below:

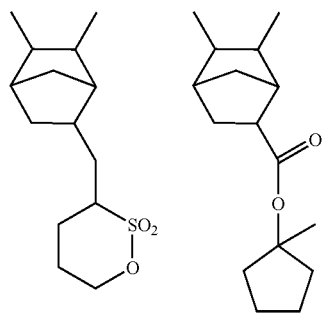

Example 2 a) Synthesis of Hydroxy Functionalized Norbornene Sultone

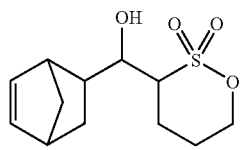

Synthesis of hydroxyl containing sultone norbornene monomer (HO-Sul-NB): In a 3-neck 250 mL round bottom flask equipped with a mechanical stirrer and a thermometer, 1,4-butane sultone (27.2 g, 0.20 mol) was dissolved in anhydrous tetrahydrofuran, THF (150 mL). To the solution at −70 C, n-Butyl Lithium 10M in hexane (21.0 mL, 0.21 mol) was added drop wise, followed by the slow addition of 5-norbornene-2-carboxaldehyde (24.4 g, 0.20 mol) by syringe. The reaction mixture was stirred overnight allowing the temperature to rise to ambient. It was worked up by pouring the reaction mixture into water. The organic extracted into an ethyl acetate solution was washed with water then dried over the MgSO$_4$. After removal of solvents by evaporation, the crude product was purified by crystallization in ethyl acetate to give 21 g, 40.6% yield. NMR showed the endo/exo isomers ratio is 89/11. For one major endo isomer $^1$H NMR (500 MHz in CDCl$_3$): 6.20 (dd, 1H), 6.04 (dd, 1H), 4.47 (m, 2H), 3.73 (m, 1H), 3.08 (m, 1H), 3.04 (m, 1H), 2.84 (m, 1H), 2.2-2.35 (m, 3H), 1.97 (m, 2H), 1.74 (m, 1H), 1.46 (m, 1H), 1.24 (m, 1H), 0.5 (d, 1H); $^{13}$C NMR (125 MHz, in CDCl$_3$): 138.06, 132.63, 74.21, 70.86, 62.32, 49.22, 44.15, 42.46, 41.51, 28.87, 24.40, 21.94. FI-MS m/e: 258 b) Synthesis of Copolymers of t-BuEsterNB and HO-Sul NB

In a 100 ml crimped vial, t-BuEsterNB (3.4 g, 17.5 mmol) and SulOHNB (1.94 g, 7.5 mmol) were dissolved in anhydrous toluene (40 mL). The monomer solution was then purged with nitrogen gas for 30 minutes. A nickel catalyst solution was prepared in a dry-box by dissolving of (toluene)Ni(C$_6$F$_5$)$_2$ catalyst (0.25 g, 0.5 mmol) in 10 ml of dry toluene. The catalyst solution was added to the monomer via a dry syringe. The reaction mixture was then stirred overnight. The polymer was precipitated into hexane and filtered. It yielded 3.5 g of white powder. The polymer was characterized with C$^{13}$ NMR (173.4 ppm, (C=O); 79.24 ppm, (tertiary C of t-butyl ester); 62-78 (br), m, (3C-alcohol, and C next to sultone), 43.7 ppm (br), 28.52 s, t-butyl groups).

The polymerization reaction is schematically represented below:

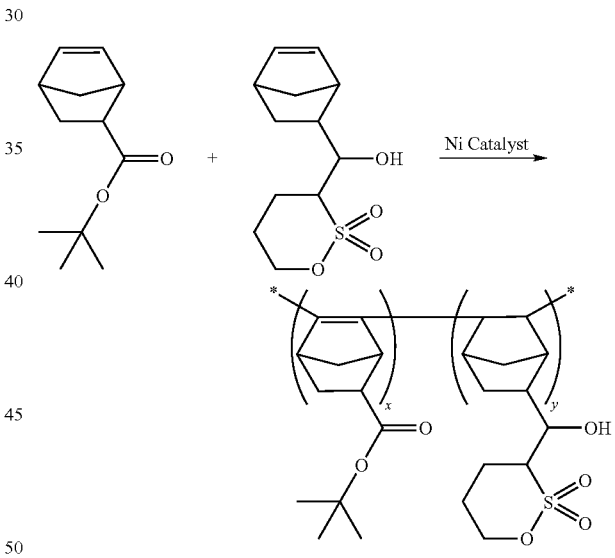

Example 3 a) Copolymer of HexylNorbornene and HO-Sul-NB (Prospective)

In a 100 ml crimped vial, hexylnorbornene (3.12 g, 17.5 mmol) and SulOHNB (1.94 g, 7.5 mmol) is dissolved in anhydrous toluene (40 mL). The monomer solution is then purged with nitrogen gas for 30 minutes. A nickel catalyst solution which is typically prepared in a dry-box by dissolving of (toluene)Ni(C$_6$F$_5$)$_2$ catalyst (0.25 g, 0.5 mmol) in 10 ml of dry toluene. The catalyst solution is then added to the monomer via a dry syringe. The reaction mixture is then stirred at room temperature for a few hours, following which the polymer is isolated by precipitation into hexane and filtration.

The resulting polymer is hydrolyzed using aqueous base conditions to a polymer containing sulfonic acid moiety. The resulting polymer is precipitated into ethanol and dried in a vacuum oven for a few hours. This polymer is then dissolved in DMSO and formulated with (3,4-epoxycyclohexylmethyl-3,4-epoxycylohexane carboxylate. The solvent is evaporated at 60° C. for 12 hours to form a dry film, which is then baked at 150° C. under vacuum to obtain a crosslinked film/membrane.

Type II Examples

Example 4

100 g of Appear™ 3000 or poly (methyl acetate norbornene) (manufactured by Promerus, LLC) was dissolved in 1 L toluene with vigorous stirring. To this polymer solution was slowly added, aqueous solution of sodium hydroxide (28 g of sodium hydroxide in 200 mL of water), using an addition funnel. This was followed by slow addition of a solution of tetra n-butyl ammonium bromide (22.6 g in 100 mL of water). The reaction mixture was stirred and heated to 60° C. for 2 hours. The solution turned from transparent to opaque with eventual formation of precipitates. The solution was then poured into 5 L of methanol and the precipitates were filtered, washed with methanol and water several times. The precipitate was then dried in a vacuum oven. 72 g of white powder, poly (hydroxyl methyl norbornene), was obtained in a yield of 96%.

2.41 g of sodium hydride (55 wt % in mineral oil) and 1 L of DMSO were placed in a flask, under an atmosphere of nitrogen gas. All of the following reactions were carried out in an atmosphere of nitrogen. To this 24.8 g of poly(hydroxy methyl norbornene) (prepared by above described procedure) was added to the solution little by little under a nitrogen gas stream. The solution was then heated at 85° C. for 1 hour with stirring. Following this, 5.12 ml of 1,4-butanesultone was added thereto. Thereafter, the solution was heated at 85° C. for another 30 minutes with efficient stirring. The solution turned yellow and the viscosity of the solution decreased considerably. The solution was filtered hot and the filtrate was poured into a tray, dried at 60° C. for 12 hours. Following this, the dried material was immersed in 1 M hydrochloric acid for 12 hours, and then immersed in doubly distilled, deionized water for 12 hours, thus obtaining a film (FN-1)

Structure of FN-1

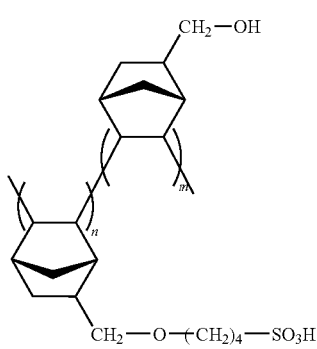

Example 5

To 20 g of FN-1 in 1 L of DMSO, was added 20 ml of dehydrated pyridine and 1 L of acetic anhydride. The solution was allowed to react for 12 hours. The solution was then allowed to settle and the supernatant fluid was removed by decantation. The residual solution containing a solid on the bottom of the beaker was added to a large amount of doubly distilled, deionized water. Next, the solid was filtered, washed with deionized water three times, and then dried to obtain 25 g of a solid of FN-2 (yield: 88%). 3 g of this FN-2 was dissolved in 100 ml of dimethyl sulfoxide, and the solution was poured in a tray and then dried at 60° C. After 12 hours, the polymer was removed to obtain a free standing film.

Structure of FN-2

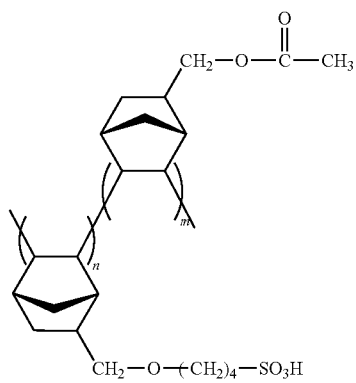

Examples of Type III

Example 6

To a glass vial equipped with a stir bar and maintained under nitrogen was placed 35 g of Decyl norbornene, 70 g of phenyl ethyl norbornene and 5.3 g of 1-hexene in 400 ml of dry toluene. The solution was allowed to heat at 80° C. and stirred for an hour. A palladium catalyst solution (0.011 g of allyl palladium tricyclohexylphosphine trifluoroacetate catalyst in 0.25 ml of dry methylene chloride) and co-catalyst solution (0.064 g of DAN-FABA co-catalyst in 0.75 ml of dry methylene chloride) were prepared in a dry box. The catalyst solution and co-catalyst solution were added to the reaction mixture via a dry syringe. At these weights, the ratio of monomers to palladium catalyst to co-catalyst ratio was 25K:1:4. The reaction solution was stirred at 80° C. for two hours where the viscosity of the reaction solution was significantly increased. In order to ensure reaction termination, added 10 ml of acetonitrile. The polymer was isolated by precipitation into methanol. The obtained polymer was washed with methanol several times and dried under vacuum at 80° C. for 8 hours. The yield was determined to be 91 g of solid polymer. The ratio was determined by NMR to be 70/30 PENB/DecylNB.

70/30 Dec/PhE-PNB (10 g) as synthesized in the previous example was dissolved into 500 ml of dichloroethane and 200 ml of chloroform at room temperature. The reaction vessel was charged with nitrogen and cooled to 0° C. after the polymer was completely dissolved. A chlorosulfonic acid solution consisting of 4.15 g of chlorosulfonic acid and 4.15 g of chloroform was slowly added to the polymer solution keeping the temperature of the solution under 5° C. The solution was allowed to stir for two hours following the addition of chlorosulfonic acid. To this reaction solution 50 ml of methanol was added to terminate the reaction. The sulfonated polymer was then precipitated into about 1 L of acetonitrile.

The resulting polymer was washed with 700 ml of acetonitrile and 700 ml of deionized water two times. The polymer was filtered and dried to obtain 11.2 g of a solid (FN-3). Following this, the dried FN-3 was immersed in 1 M sodium chloride aqueous solution for 12 hours to convert into the sodium sulfonate form, and then, immersed in deionized water for a further 12 hours. 1 g of this sodium-form of FN-3 was dissolved in 100 ml of dimethyl sulfoxide, and the solution was poured in a tray that is heated at 50° C. in order to evaporate the solvent. After 12 hours a free standing film was removed from the tray. This was then immersed in 1M hydrochloric acid aqueous solution to convert to the acid form. The final cleaning was done by immersing in deionized water for 12 hours, thus obtaining the film (FN-3).

Structure of FN-3

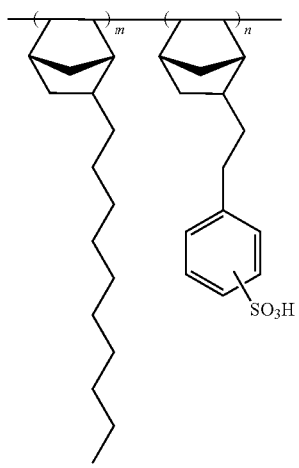

Where m:n=70:30

Example 7

This prophetic example is presented to demonstrate that various multicyclic aromatic norbornene-type monomers can be prepared. Generally, such monomers are formed by first adding the multicyclic aromatic moiety to a norbornene-type structure, polymerizing the resultant monomer with other appropriate monomers and subsequently functionalizing the aromatic portion of the now repeating units of the polymer as described herein below:

Synthesis of Multicyclic Aromatic Bearing Norbornene Species

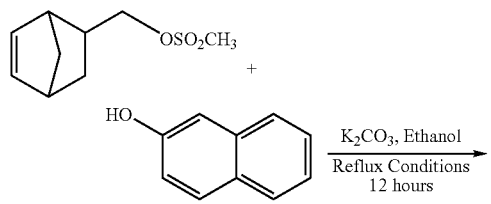

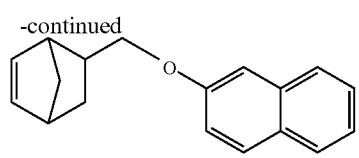

Product is purified by recrystallization 5-norbornene-2-methoxy mesylate (50 g, 0.25 mol.) is weighed out into a flask along with 2-naphthol (31.09 g, 0.275 mol.) and potassium carbonate (41.5 g, 0.3 mol.). To this mixture, is added 250 mL of ethanol. This mixture is refluxed for about 12 hours. Upon filtration, followed by removal of solvent one is able to isolate the crude product, which is further purified by dissolving in dichloromethane and washing with 5% sodium bicarbonate solution in water. The product, $NBCH_2$—O-Nap is isolated by recrystallization from hexane.

In a similar fashion, other aromatic polycyclic norbornene monomers can be synthesized. Additionally, the same products can be obtained by substituting 5-norbornene-2-methoxy mesylate with 5-norbornene-2-methoxy tosylate or 5-norbornene-2-methyl halide (chloride, bromide or iodide).

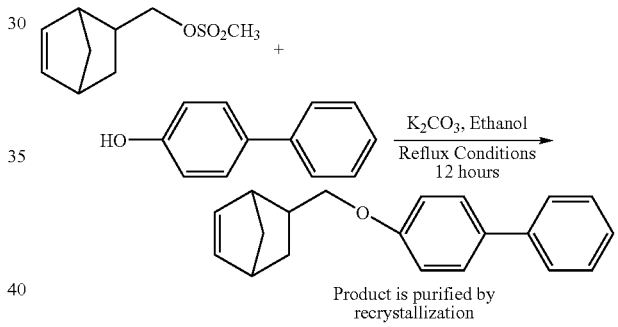

Product is purified by recrystallization

Naphthyl, biphenyl or other multicyclic aromatic monomers can be polymerized and subsequently functionalized with sulfonic groups as described in Example 6, above.

Example 8a a) Synthesis of PENB:$C_6F_{13}$NB (70:30)

All glassware was dried in an oven at 125° C. for at least 8 hours and then cooled under vacuum. The glassware was then transferred into a glove box and the reaction vessel was assembled inside the glove box. Trifluorotoluene ($C_6H_5$—$CF_3$) (64 g), Phenyl ethyl norbornene (6 g, 0.03 mol) and perfluorohexyl norbornene (5.3 g, 0.013 mol) were added to the reaction vessel. This will give you a 15 wt % solution in the solvent. The reaction vessel was removed from the glove box and connected to a dry nitrogen line. The reaction solution was degassed by passing a stream of nitrogen gas through the solution for 10 minutes. Inside the glovebox, 0.42 g (0.86 mmol) of bis(perfluorophenyl) (η6-toluene) Nickel catalyst was dissolved in 3 ml of trifluorotoluene, taken up in a 5 mL syringe, removed from the glove box and injected into the reactor. The reaction was stirred at 20° C. for 5 hours or until the solution increased in viscosity.

b) Purification

At this time peracetic acid (50 molar equivalents based on Ni catalyst—43 mmol) solution (2.5 ml glacial acetic acid diluted with ~50 ml deionized water and 5 g of 30 wt % hydrogen peroxide diluted with ~50 ml deionized water) was added and the solution was stirred for 12 hours. Stirring was stopped and water and solvent layers were allowed to separate. The water layer was removed and 100 mL of distilled water was added to the remaining organic layer. The solution was stirred for 20 minutes. The water layer was permitted to separate and was removed. The wash with 100 mL of distilled water was performed a total of 3 times.

c) Isolation

Polymer was then precipitated from the organic layer by addition of the organic layer into MeOH or appropriate solvent. The solid polymer was recovered by filtration and dried overnight at 60° C. in a vacuum oven.

Example 8b a) Synthesis PENB:C6F5 CH2 NB (50:50)

All glassware was dried in an oven at 125° C. for at least 8 hours and then cooled under vacuum. The glassware was then transferred into a glove box and the reaction vessel was assembled inside the glove box. Trifluorotoluene ($C_6H_5$—$CF_3$) (80 g), Phenyl ethyl norbornene (6 g, 0.03 mol) and perfluorohexyl norbornene (8.22 g, 0.03 mol) were added to the reaction vessel. This will give you a 15 wt % solution in the solvent. The reaction vessel was removed from the glove box and connected to a dry nitrogen line. The reaction solution was degassed by passing a stream of nitrogen gas through the solution for 10 minutes. Inside the glovebox, 0.58 g (1.2 mmol) of bis(perfluorophenyl) (η6-toluene) Nickel catalyst was dissolved in 3 ml of trifluorotoluene, taken up in a 5 mL syringe, removed from the glove box and injected into the reactor. The reaction was stirred at 20° C. for 5 hours or until the solution increased in viscosity.

b) Purification

At this time peracetic acid (50 molar equivalents based on Ni catalyst—60 mmol) solution (3.6 ml glacial acetic acid diluted with ~50 ml deionized water and 6.8 g of 30 wt % hydrogen peroxide diluted with ~50 ml deionized water) was added and the solution was stirred for 12 hours. Stirring was stopped and water and solvent layers were allowed to separate. The water layer was removed and 100 mL of distilled water was added to the remaining organic layer. The solution was stirred for 20 minutes. The water layer was permitted to separate and was removed. The wash with 100 mL of distilled water was performed a total of 3 times.

c) Isolation

Polymer was then precipitated from the organic layer by addition of the organic layer into MeOH or appropriate solvent. The solid polymer was recovered by filtration and dried overnight at 60° C. in a vacuum oven.

Characterization of Membrane Properties

Measurement of Proton Conductivity

The FN-1 film was placed between two electrodes containing a platinum catalyst. The electrode/film assembly was placed into a sealed cell in a dry atmosphere, and an absolute value of impedance and a phase angle of the resultant sample at frequencies in a range of 100 to 15 MHz were measured using an impedance analyzer (HP4192A made by YOKOGAWA HEWLETT AND PACKARD, LTD.) to produce a plot of complex impedance. Proton conductivity was calculated based on the complex impedance plot, and it was determined to be 0.011 S/cm for polymer FN-1. It should be noted that the measurement was carried out in an atmosphere of 100% humidity. Immediately after the measurement, the film was taken out of the cell to measure its thickness by using a film thickness meter. A thickness of the film when swelled was 137 μm. (original thickness of 135 μm)

Measurement of Methanol Permeability

The film of FN-1 obtained above was arranged so that one side of the film might be brought into contact with a mixture of methanol/pure water=30/70 wt % and the other side of the film might be brought into contact with pure water over a contact area (9.9 $cm^2$). While the solutions on both the sides were stirred, the amount of methanol permeated into the pure water side through the film at room temperature after 8 hours was measured. As per this technique, methanol permeability of FN-1 was determined to be $2.31 \times 10^{-5}$ (mol/min·$cm^2$). Methanol concentration in pure water was determined by use of a gas chromatograph and the number of moles of permeated methanol was calculated on the basis of the obtained methanol concentration.

Determination of Ion-Exchange Capacity

A piece of film (FN-1) was weighed, and then immersed in 40 mL of a 0.1 mol/L aqueous NaCl solution for 12 hours. Thereafter, 20 mL of the solution was sampled and then titrated with a 0.05 mol/L aqueous sodium hydroxide solution. Ion-exchange capacity was calculated in accordance with the formula:

$$\text{Ion-exchange capacity(meq/g)} = (0.05 \times f \times y)/(0.5 \times X)$$

wherein y (ml) is an amount of the aqueous sodium hydroxide solution required in the titration, and f is a factor of the aqueous sodium hydroxide solution. The ion-exchange capacity was determined to be 0.85 (meq/g). In this case, the titration was carried out by use of an automatic titrator, and when the pH reached 7, it was terminated.

Characterization of FN-2

Various properties of the FN-2 film were measured in the same manner as for FN-1. Proton conductivity was determined to be 0.010 (S/cm). Thickness of the swelled film was 64 μm. Methanol permeability was determined to be $3.63 \times 10^{-5}$ (mol/min·$cm^2$), and the ion-exchange capacity was 1.09 (meq/g).

Characterization of FN-3

Proton conductivity was determined to be 0.025 (S/cm). Thickness of the swelled film was 104 μm. Methanol permeability was determined to be $6.60 \times 10^{-5}$ (mol/min·$cm^2$), and the ion-exchange capacity was 1.69 (meq/g).

Example

Comparative

For a commercially available ion exchange film (Nafion 117 made by Du Pont), various properties were measured in the same manner as in Example 1. Proton conductivity was determined to be 0.051 (S/cm). Thickness of the swelled film was 210 μm, methanol permeability was determined to be 5.09×10$^{-5}$ (mol/min·cm$^2$), and ion-exchange capacity was determined to be 0.86 (meq/g).

TABLE 1

|  |  | Nafion117 | FN-1 | FN-2 | FN-3 |
|---|---|---|---|---|---|
| Thickness(um) (for M.P.) |  | 180 | 86 | 172 | 88 |
| IEC(meq/g) |  | 0.86 | 0.85 | 1.14 | 1.68/1.57* |
| Proton conductivity (S/cm) |  | 0.053 | 0.012 | 0.026 | 0.029 |
| Methanol permeability (ratio vs Nafion117) |  | 1 | 0.28 | 0.44 | 1.69 |
| Flexibility | Normal state | good | brittle | good | good |
|  | 80° C. 6 hours | good | brittle | brittle | good |
| Swelling degree |  | 21 | — | 11 | 14 |

What is claimed is:

1. An ion conducting membrane comprising an addition polymer comprising polycyclic repeating units having the structural formula:

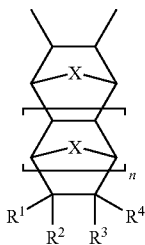

wherein X represents —CH$_2$—, —CH$_2$CH$_2$—, O or S; n is an integer from 0 to 5 inclusive; R$^1$ to R$^4$ independently represent hydrogen or a pendant group selected from linear and branched (C$_1$ to C$_{20}$) alkyl, linear and branched (C$_1$ to C$_{20}$) haloalkyl, or a pendant ion conducting moiety and salts thereof selected from sulfonic acid, phosphoric acid, carboxylic acid moieties and combinations thereof, represented by the formulae:

-(A)$_q$-SO$_3$H

-(A)$_q$-OP(O)(OH)(OR)

-(A)$_q$-P(O)(OH)(OR)

—(CH$_2$)$_m$C(O)OH wherein A is a spacer moiety represented —(CH$_2$)$_m$—, —(CH$_2$)$_m$O—, —(CH$_2$)$_m$O(CH$_2$)$_m$—, —O(CH$_2$)$_m$—, —(CH$_2$)$_m$NR$^{15}$(CH$_2$)$_m$—, —(CH$_2$)$_m$-aryl-, —O(CH$_2$)$_m$-aryl-, —(CH$_2$)$_m$O(CH$_2$)$_m$-aryl-, -aryl-O(CH$_2$)$_m$—, -aryl-NR$^{15}$(CH$_2$)$_m$—, —(C(R$^{16}$)$_2$)$_m$(C(R$^{16}$)$_2$)$_m$O(C(R$^{17}$)$_2$)$_a$—,

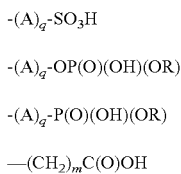 and

-continued

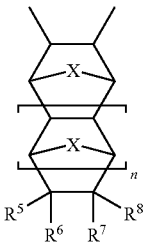

wherein aryl represents phenyl, naphthyl, and anthracenyl, R is selected from hydrogen, linear and branched (C$_1$ to C$_{10}$) alkyl, linear and branched (C$_1$ to C$_{10}$) haloalkyl, and substituted and unsubstituted (C$_6$-C$_{16}$) aryl; R$^{15}$ independently is selected from hydrogen and (C$_1$ to C$_5$) alkyl; R$^{16}$ independently is selected from hydrogen, halogen, (C$_1$ to C$_5$) alkyl, and (C$_1$ to C$_5$) haloalkyl R$^{17}$ independently is selected from hydrogen and halogen; R$^{18}$ is selected from hydrogen and (C$_1$ to C$_{10}$) alkyl and (C$_1$ to C$_5$) haloalkyl; a is 2 to 6; m independently is 0 to 4 and q is 0 or 1, subject to the proviso that for at least a portion of such repeating units, at least one of R$^1$ to R$^4$ is a phosphoric acid moiety not directly connected to an oxygen atom on said spacer moiety.

2. The ion conducting membrane of claim 1 further comprising a polycyclic repeating unit containing a pendant group selected from an alkenyl containing moiety, an alkylidenyl containing moiety, a carboxyl containing moiety, a hydroxyl containing moiety, a trialkoxysilyl containing moiety, an epoxy containing moiety, a cinnamate containing moiety, an acrylate containing moiety, a sulfonic acid containing moiety, and combinations thereof.

3. The ion conducting membrane of claim 1 further comprising a polycyclic repeating unit represented by the structural formula

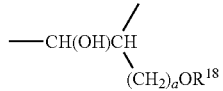

wherein X and n are as defined previously, R$^5$ to R$^8$ independently represent hydrogen or a pendant group selected from linear and branched (C$_1$ to C$_{20}$) alkyl; linear and branched (C$_1$ to C$_{20}$) haloalkyl; substituted and unsubstituted (C$_4$-C$_{12}$) cycloalkyl; linear and branched (C$_2$ to C$_{10}$) alkenyl; substituted and unsubstituted (C$_5$-C$_8$) cycloalkenyl; (C$_2$-C$_{10}$) alkynyl; substituted and unsubstituted (C$_6$-C$_{24}$) aryl; substituted and unsubstituted (C$_7$-C$_{24}$) aralkyl; hydroxyl; substituted and unsubstituted (C$_1$ to C$_{10}$) hydroxyalkyl; —(CH$_2$)$_m$C(CF$_3$)$_2$OR; —(CH$_2$)$_m$C(O)OR$^9$; —(CH$_2$)$_m$OR$^9$; —(CH$_2$)$_m$OC(O)R$^9$; —(CH$_2$)$_m$C(O)R$^9$; —(CH$_2$)$_m$OC(O)OR$^9$; —(CH$_2$)$_m$C(O)OR$^{10}$; —(CH$_2$)$_m$Si(R$^{11}$)$_3$; —(CH$_2$)$_m$Si(OR$^{11}$)$_3$; —(CH$_2$)$_m$NR$^{12}$SO$_2$R$^{13}$; —(CH$_2$)$_m$SO$_2$NR$^{12}$R$^{13}$; —(CH$_2$)$_m$NHR; and radicals selected from the structures below:

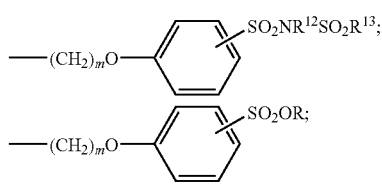

-continued

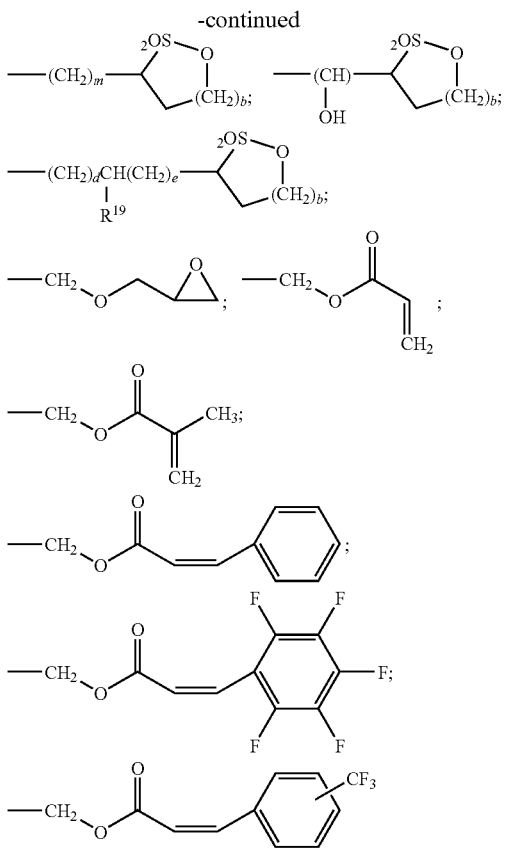

wherein b is 1 to 4; d is 0 to 2; e is 0 or 1; $R^9$ is selected from hydrogen, linear or branched ($C_1$ to $C_{10}$) alkyl, substituted and unsubstituted ($C_4$-$C_8$) cycloalkyl, substituted and unsubstituted ($C_6$-$C_{24}$) aryl, and substituted and unsubstituted ($C_7$-$C_{24}$) aralkyl; $R^{10}$ is selected from an acid labile group; $R^{11}$ independently is selected from hydrogen and ($C_1$ to $C_5$) alkyl; $R^{12}$ is selected from hydrogen, linear and branched ($C_1$-$C_5$) haloalkyl, linear and branched tri($C_1$-$C_{10}$) alkylsilyl, and the groups —C(O)CF$_3$, —C(O)OR$^{14}$, and —OC(O)OR$^{14}$; $R^{13}$ is selected from hydrogen, linear and branched ($C_1$-$C_{10}$) alkyl, linear and branched ($C_1$-$C_5$) haloalkyl, —OR, —C(O)R, substituted and unsubstituted ($C_3$-$C_8$) cycloalkyl, substituted and unsubstituted cyclic esters containing 2 to 8 carbon atoms substituted and unsubstituted cyclic ketones containing 4 to 8 carbon atoms, substituted and unsubstituted cyclic ethers and cyclic diethers containing 4 to 8 carbon atoms; $R^{14}$ is selected from linear and branched ($C_1$-$C_{10}$) alkyl, linear and branched ($C_1$-$C_{10}$) haloalkyl, substituted and unsubstituted ($C_6$-$C_{14}$) aryl, and substituted and unsubstituted ($C_7$-$C_{20}$) aralkyl; $R^{19}$ is selected from hydrogen, —OH, and —COOR; $R^5$ and $R^6$ and/or $R^7$ and $R^8$ independently can be taken together to form a ($C_1$-$C_5$) alkylidenyl group or a spiral anhydride group; $R^6$ and $R^7$ taken together with the two ring carbon atoms to which they are attached form a cyclic anhydride group, a cyclic sulfonamide group, and a sultone group, each group containing 3 to 6 carbon atoms; and wherein X, m, n and R are as previously defined.

4. The ion conducting membrane of claim 2 wherein said addition polymer is crosslinked.

5. The ion conducting membrane of claim 3 wherein the polycyclic wherein a portion of said repeating units represented by the structural formula:

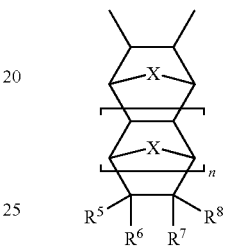

comprise repeating units where one of $R^5$ to $R^8$ represents a sultone containing moiety or one of $R^5$ or $R^6$ taken together with one of $R^7$ or $R^8$ and the carbon atoms to which they are attached represent a sultone or sultam each containing 4 to 6 carbon atoms.

6. The ion conducting membrane of claim 5 where said pendant sultone containing moiety of said repeating units is represented by one of the structural formulae:

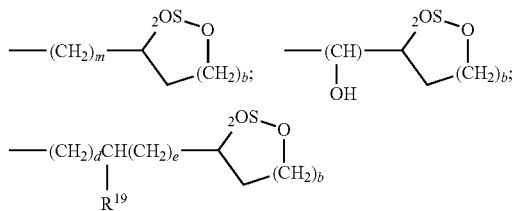

a, m and $R^{19}$ being as previously defined.

7. An electrode comprising the ion conducting membrane of claim 1.

* * * * *